United States Patent
Lynn et al.

(10) Patent No.: US 10,126,877 B1
(45) Date of Patent: Nov. 13, 2018

(54) UPDATE OF REFERENCE DATA FOR TOUCH INPUT DETECTION

(71) Applicant: Sentons Inc., San Jose, CA (US)

(72) Inventors: Lapoe E. Lynn, Los Altos, CA (US); Shirish A. Altekar, Palo Alto, CA (US); Stanislav Maximov, Mountain View, CA (US)

(73) Assignee: Sentons Inc. (KY)

( * ) Notice: Subject to any disclaimer, the term of this patent is extended or adjusted under 35 U.S.C. 154(b) by 0 days.

(21) Appl. No.: 15/421,675

(22) Filed: Feb. 1, 2017

(51) Int. Cl.
*G06F 3/041* (2006.01)
*G06F 3/043* (2006.01)

(52) U.S. Cl.
CPC .......... *G06F 3/0418* (2013.01); *G06F 3/0436* (2013.01)

(58) Field of Classification Search
CPC .............................. G06F 3/0418; G06F 3/0436
See application file for complete search history.

(56) References Cited

U.S. PATENT DOCUMENTS

| | | | |
|---|---|---|---|
| 4,488,000 A | 12/1984 | Glenn |
| 4,594,695 A | 6/1986 | Garconnat |
| 4,966,150 A | 10/1990 | Etienne |
| 5,091,406 A | 2/1992 | Toda |
| 5,334,805 A | 8/1994 | Knowles |
| 5,451,723 A | 9/1995 | Huang |
| 5,563,849 A | 10/1996 | Hall |
| 5,573,077 A | 11/1996 | Knowles |
| 5,635,643 A | 6/1997 | Maji |
| 5,637,839 A | 6/1997 | Yamaguchi |
| 5,708,460 A | 1/1998 | Young |
| 5,739,479 A | 4/1998 | Davis-Cannon |
| 5,784,054 A | 7/1998 | Armstrong |
| 5,854,450 A | 12/1998 | Kent |
| 5,883,457 A | 3/1999 | Rinde |
| 5,912,659 A | 6/1999 | Rutledge |
| 6,091,406 A | 7/2000 | Kambara |
| 6,232,960 B1 | 5/2001 | Goldman |
| 6,236,391 B1 | 5/2001 | Kent |
| 6,254,105 B1 | 7/2001 | Rinde |
| 6,262,946 B1 | 7/2001 | Khuri-Yakub |

(Continued)

FOREIGN PATENT DOCUMENTS

| | | |
|---|---|---|
| CN | 101373415 B | 2/2009 |
| CN | 101669088 B | 3/2010 |

(Continued)

OTHER PUBLICATIONS

Liu et al., 'Acoustic Wave Approach for Multi-Touch Tactile Sensing', Micro-NanoMechatronics and Human Science, 2009. MHS 2009. International Symposium, Nov. 9-11, 2009.

(Continued)

*Primary Examiner* — Ariel Balaoing
(74) *Attorney, Agent, or Firm* — Van Pelt, Yi & James LLP

(57) ABSTRACT

At a receiver associated with a transmitter-receiver pair, a propagating signal transmitted by a transmitter associated with the pair is received. A detected disturbance to a signal property of the propagating signal is analyzed with respect to reference data associated with the pair to detect whether a touch input has been provided. If the detected disturbance meets a criteria then the reference data associated with the pair is updated using the received propagating signal.

19 Claims, 20 Drawing Sheets

(56) References Cited

U.S. PATENT DOCUMENTS

| | | |
|---|---|---|
| 6,307,942 B1 | 10/2001 | Azima |
| 6,473,075 B1 | 10/2002 | Gomes |
| 6,492,979 B1 | 12/2002 | Kent |
| 6,498,603 B1 | 12/2002 | Wallace |
| 6,507,772 B1 | 1/2003 | Gomes |
| 6,535,147 B1 | 3/2003 | Masters |
| 6,567,077 B2 | 5/2003 | Inoue |
| 6,630,929 B1 | 10/2003 | Adler |
| 6,633,280 B1 | 10/2003 | Matsumoto |
| 6,636,201 B1 | 10/2003 | Gomes |
| 6,788,296 B2 | 9/2004 | Ikeda |
| 6,798,403 B2 | 9/2004 | Kitada |
| 6,856,259 B1 | 2/2005 | Sharp |
| 6,891,527 B1 | 5/2005 | Chapman |
| 6,922,642 B2 | 7/2005 | Sullivan |
| 6,948,371 B2 | 9/2005 | Tanaka |
| 7,000,474 B2 | 2/2006 | Kent |
| 7,006,081 B2 | 2/2006 | Kent |
| 7,116,315 B2 | 10/2006 | Sharp |
| 7,119,800 B2 | 10/2006 | Kent |
| 7,187,369 B1 | 3/2007 | Kanbara |
| 7,193,617 B1 | 3/2007 | Kanbara |
| 7,204,148 B2 | 4/2007 | Tanaka |
| 7,218,248 B2 | 5/2007 | Kong |
| 7,274,358 B2 | 9/2007 | Kent |
| RE39,881 E | 10/2007 | Flowers |
| 7,315,336 B2 | 1/2008 | North |
| 7,345,677 B2 | 3/2008 | Ing |
| 7,411,581 B2 | 8/2008 | Hardie-Bick |
| 7,456,825 B2 | 11/2008 | Kent |
| 7,511,711 B2 | 3/2009 | Ing |
| 7,545,365 B2 | 6/2009 | Kent |
| 7,554,246 B2 | 6/2009 | Maruyama |
| 7,583,255 B2 | 9/2009 | Ing |
| 7,649,807 B2 | 1/2010 | Ing |
| 7,683,894 B2 | 3/2010 | Kent |
| 7,880,721 B2 | 2/2011 | Suzuki |
| 7,920,133 B2 | 4/2011 | Tsumura |
| 8,059,107 B2 | 11/2011 | Hill |
| 8,085,124 B2 | 12/2011 | Ing |
| 8,194,051 B2 | 6/2012 | Wu |
| 8,228,121 B2 | 7/2012 | Benhamouda |
| 8,237,676 B2 | 8/2012 | Duheille |
| 8,319,752 B2 | 11/2012 | Hardie-Bick |
| 8,325,159 B2 | 12/2012 | Kent |
| 8,358,277 B2 | 1/2013 | Mosby |
| 8,378,974 B2 | 2/2013 | Aroyan |
| 8,392,486 B2 | 3/2013 | Ing |
| 8,427,423 B2 | 4/2013 | Tsumura |
| 8,436,806 B2 | 5/2013 | Almalki |
| 8,436,808 B2 | 5/2013 | Chapman |
| 8,493,332 B2 | 7/2013 | D'Souza |
| 8,576,202 B2 | 11/2013 | Tanaka |
| 8,619,063 B2 | 12/2013 | Chaine |
| 8,638,318 B2 | 1/2014 | Gao |
| 8,648,815 B2 | 2/2014 | Kent |
| 8,659,579 B2 | 2/2014 | Nadjar |
| 8,670,290 B2 | 3/2014 | Aklil |
| 8,681,128 B2 | 3/2014 | Scharff |
| 8,692,809 B2 | 4/2014 | D'Souza |
| 8,692,810 B2 | 4/2014 | Ing |
| 8,692,812 B2 | 4/2014 | Hecht |
| 8,730,213 B2 | 5/2014 | D'Souza |
| 8,749,517 B2 | 6/2014 | Aklil |
| 8,787,599 B2 | 7/2014 | Grattan |
| 8,823,685 B2 | 9/2014 | Scharff |
| 8,854,339 B2 | 10/2014 | Kent |
| 8,890,852 B2 | 11/2014 | Aroyan |
| 8,896,429 B2 | 11/2014 | Chaine |
| 8,896,564 B2 | 11/2014 | Scharff |
| 8,917,249 B1 | 12/2014 | Buuck |
| 8,941,624 B2 | 1/2015 | Kent |
| 8,946,973 B2 | 2/2015 | Pelletier |
| 8,994,696 B2 | 3/2015 | Berget |
| 9,030,436 B2 | 5/2015 | Ikeda |
| 9,041,662 B2 | 5/2015 | Harris |
| 9,046,959 B2 | 6/2015 | Schevin |
| 9,046,966 B2 | 6/2015 | D'Souza |
| 9,058,071 B2 | 6/2015 | Esteve |
| 9,099,971 B2 | 8/2015 | Lynn |
| 9,189,109 B2 | 11/2015 | Sheng |
| 9,348,468 B2 | 5/2016 | Altekar |
| 9,594,450 B2 | 3/2017 | Lynn |
| 9,983,718 B2 | 5/2018 | Sheng |
| 2001/0050677 A1 | 12/2001 | Tosaya |
| 2002/0047833 A1 | 4/2002 | Kitada |
| 2002/0185981 A1 | 12/2002 | Dietz |
| 2003/0161484 A1 | 8/2003 | Kanamori |
| 2003/0189745 A1 | 10/2003 | Kikuchi |
| 2003/0197691 A1 | 10/2003 | Fujiwara |
| 2003/0206162 A1 | 11/2003 | Roberts |
| 2004/0133366 A1 | 7/2004 | Sullivan |
| 2004/0160421 A1 | 8/2004 | Sullivan |
| 2004/0183788 A1 | 9/2004 | Kurashima |
| 2004/0203594 A1 | 10/2004 | Kotzin |
| 2004/0239649 A1 | 12/2004 | Ludtke |
| 2004/0246239 A1 | 12/2004 | Knowles |
| 2005/0063553 A1 | 3/2005 | Ozawa |
| 2005/0146511 A1 | 7/2005 | Hill |
| 2005/0146512 A1* | 7/2005 | Hill ............... G06F 3/0436 345/173 |
| 2005/0174338 A1 | 8/2005 | Ing |
| 2005/0226455 A1 | 10/2005 | Aubauer |
| 2005/0248540 A1 | 11/2005 | Newton |
| 2006/0071912 A1 | 4/2006 | Hill |
| 2006/0109261 A1 | 5/2006 | Chou |
| 2006/0114233 A1 | 6/2006 | Radivojevic |
| 2006/0139339 A1 | 6/2006 | Pechman |
| 2006/0139340 A1 | 6/2006 | Geaghan |
| 2006/0152499 A1 | 7/2006 | Roberts |
| 2006/0166681 A1 | 7/2006 | Lohbihler |
| 2006/0197753 A1 | 9/2006 | Hotelling |
| 2006/0262104 A1 | 11/2006 | Sullivan |
| 2006/0279548 A1 | 12/2006 | Geaghan |
| 2006/0284841 A1 | 12/2006 | Hong |
| 2007/0019825 A1 | 1/2007 | Marumoto |
| 2007/0109274 A1 | 5/2007 | Reynolds |
| 2007/0165009 A1 | 7/2007 | Sakurai |
| 2007/0171212 A1 | 7/2007 | Sakurai |
| 2007/0183520 A1 | 8/2007 | Kim |
| 2007/0211022 A1 | 9/2007 | Boillot |
| 2007/0214462 A1 | 9/2007 | Boillot |
| 2007/0229479 A1 | 10/2007 | Choo |
| 2007/0279398 A1 | 12/2007 | Tsumura |
| 2008/0018618 A1 | 1/2008 | Hill |
| 2008/0030479 A1 | 2/2008 | Lowles |
| 2008/0062151 A1 | 3/2008 | Kent |
| 2008/0081671 A1 | 4/2008 | Wang |
| 2008/0105470 A1 | 5/2008 | Van De Ven |
| 2008/0111788 A1 | 5/2008 | Rosenberg |
| 2008/0169132 A1 | 7/2008 | Ding |
| 2008/0174565 A1 | 7/2008 | Chang |
| 2008/0198145 A1 | 8/2008 | Knowles |
| 2008/0231612 A1 | 9/2008 | Hill |
| 2008/0259030 A1 | 10/2008 | Holtzman |
| 2008/0266266 A1 | 10/2008 | Kent |
| 2008/0284755 A1 | 11/2008 | Hardie-Bick |
| 2009/0009488 A1 | 1/2009 | D'Souza |
| 2009/0103853 A1 | 4/2009 | Daniel |
| 2009/0116661 A1 | 5/2009 | Hetherington |
| 2009/0146533 A1 | 6/2009 | Leskinen |
| 2009/0160728 A1 | 6/2009 | Emrick |
| 2009/0167704 A1 | 7/2009 | Terlizzi |
| 2009/0237372 A1 | 9/2009 | Kim |
| 2009/0271004 A1 | 10/2009 | Zecchin |
| 2009/0273583 A1 | 11/2009 | Norhammar |
| 2009/0309853 A1 | 12/2009 | Hildebrandt |
| 2009/0315848 A1 | 12/2009 | Ku |
| 2010/0026667 A1 | 2/2010 | Bernstein |
| 2010/0027810 A1 | 2/2010 | Marton |
| 2010/0044121 A1 | 2/2010 | Simon |
| 2010/0045635 A1 | 2/2010 | Soo |
| 2010/0079264 A1 | 4/2010 | Hoellwarth |
| 2010/0117933 A1 | 5/2010 | Gothard |

(56) References Cited

U.S. PATENT DOCUMENTS

| | | |
|---|---|---|
| 2010/0117993 A1 | 5/2010 | Kent |
| 2010/0141408 A1 | 6/2010 | Doy |
| 2010/0156818 A1 | 6/2010 | Burrough |
| 2010/0165215 A1 | 7/2010 | Shim |
| 2010/0185989 A1 | 7/2010 | Shiplacoff |
| 2010/0188356 A1 | 7/2010 | Vu |
| 2010/0245265 A1 | 9/2010 | Sato |
| 2010/0269040 A1 | 10/2010 | Lee |
| 2010/0277431 A1 | 11/2010 | Klinghult |
| 2010/0309139 A1 | 12/2010 | Ng |
| 2010/0315373 A1 | 12/2010 | Steinhauser |
| 2010/0321312 A1 | 12/2010 | Han |
| 2010/0321325 A1 | 12/2010 | Springer |
| 2010/0321337 A1 | 12/2010 | Liao |
| 2011/0001707 A1 | 1/2011 | Faubert |
| 2011/0001708 A1 | 1/2011 | Sleeman |
| 2011/0012717 A1 | 1/2011 | Pance |
| 2011/0018695 A1 | 1/2011 | Bells |
| 2011/0025649 A1 | 2/2011 | Sheikhzadeh Nadjar |
| 2011/0042152 A1 | 2/2011 | Wu |
| 2011/0057903 A1 | 3/2011 | Yamano |
| 2011/0063228 A1 | 3/2011 | St Pierre |
| 2011/0080350 A1 | 4/2011 | Almalki |
| 2011/0084912 A1 | 4/2011 | Almalki |
| 2011/0084937 A1 | 4/2011 | Chang |
| 2011/0155479 A1 | 6/2011 | Oda |
| 2011/0156967 A1 | 6/2011 | Oh |
| 2011/0167391 A1 | 7/2011 | Momeyer |
| 2011/0175813 A1 | 7/2011 | Sarwar |
| 2011/0182443 A1 | 7/2011 | Gant |
| 2011/0191680 A1 | 8/2011 | Chae |
| 2011/0199342 A1 | 8/2011 | Vartanian |
| 2011/0213223 A1 | 9/2011 | Kruglick |
| 2011/0222372 A1 | 9/2011 | O'Donovan |
| 2011/0234545 A1 | 9/2011 | Tanaka |
| 2011/0260990 A1 | 10/2011 | Ali |
| 2011/0279382 A1 | 11/2011 | Pertuit |
| 2011/0298670 A1 | 12/2011 | Jung |
| 2011/0300845 A1 | 12/2011 | Lee |
| 2011/0304577 A1 | 12/2011 | Brown |
| 2011/0316784 A1 | 12/2011 | Bisutti |
| 2011/0316790 A1 | 12/2011 | Ollila |
| 2012/0001875 A1 | 1/2012 | Li |
| 2012/0002820 A1 | 1/2012 | Leichter |
| 2012/0007837 A1 | 1/2012 | Kent |
| 2012/0026114 A1 | 2/2012 | Lee |
| 2012/0032928 A1 | 2/2012 | Alberth |
| 2012/0050230 A1 | 3/2012 | Harris |
| 2012/0062564 A1 | 3/2012 | Miyashita |
| 2012/0068939 A1 | 3/2012 | Pemberton-Pigott |
| 2012/0068970 A1 | 3/2012 | Pemberton-Pigott |
| 2012/0081337 A1 | 4/2012 | Camp, Jr. |
| 2012/0088548 A1 | 4/2012 | Yun |
| 2012/0092964 A1 | 4/2012 | Badiey |
| 2012/0120031 A1 | 5/2012 | Thuillier |
| 2012/0126962 A1 | 5/2012 | Ujii |
| 2012/0127088 A1 | 5/2012 | Pance |
| 2012/0140954 A1 | 6/2012 | Ranta |
| 2012/0149437 A1 | 6/2012 | Zurek |
| 2012/0188194 A1 | 7/2012 | Sulem |
| 2012/0188889 A1 | 7/2012 | Sambhwani |
| 2012/0194466 A1 | 8/2012 | Posamentier |
| 2012/0200517 A1 | 8/2012 | Nikolovski |
| 2012/0206154 A1 | 8/2012 | Pant |
| 2012/0229407 A1 | 9/2012 | Harris |
| 2012/0232834 A1 | 9/2012 | Roche |
| 2012/0242603 A1 | 9/2012 | Engelhardt |
| 2012/0270605 A1 | 10/2012 | Garrone |
| 2012/0272089 A1 | 10/2012 | Hatfield |
| 2012/0278490 A1 | 11/2012 | Sennett |
| 2012/0282944 A1 | 11/2012 | Zhao |
| 2012/0300956 A1 | 11/2012 | Horii |
| 2012/0306823 A1 | 12/2012 | Pance |
| 2013/0011144 A1 | 1/2013 | Amiri Farahani |
| 2013/0050133 A1 | 2/2013 | Brakensiek |
| 2013/0050154 A1 | 2/2013 | Guy |
| 2013/0057491 A1 | 3/2013 | Chu |
| 2013/0059532 A1 | 3/2013 | Mahanfar |
| 2013/0082970 A1 | 4/2013 | Frey |
| 2013/0127755 A1 | 5/2013 | Lynn |
| 2013/0141365 A1 | 6/2013 | Lynn |
| 2013/0147768 A1 | 6/2013 | Aroyan |
| 2013/0194208 A1 | 8/2013 | Miyanaka |
| 2013/0222274 A1 | 8/2013 | Mori |
| 2013/0234995 A1 | 9/2013 | Son |
| 2013/0249831 A1 | 9/2013 | Harris |
| 2014/0028576 A1 | 1/2014 | Shahparnia |
| 2014/0078070 A1 | 3/2014 | Armstrong-Muntner |
| 2014/0078086 A1 | 3/2014 | Bledsoe |
| 2014/0078109 A1 | 3/2014 | Armstrong-Muntner |
| 2014/0078112 A1 | 3/2014 | Sheng |
| 2014/0185834 A1 | 7/2014 | Frömel |
| 2014/0247230 A1* | 9/2014 | Sheng ............... G06F 3/0416 345/173 |
| 2014/0247250 A1 | 9/2014 | Sheng |
| 2014/0317722 A1 | 10/2014 | Tartz |
| 2014/0362055 A1 | 12/2014 | Altekar |
| 2014/0368464 A1 | 12/2014 | Singnurkar |
| 2015/0002415 A1 | 1/2015 | Lee |
| 2015/0009185 A1 | 1/2015 | Shi |
| 2015/0109239 A1 | 4/2015 | Mao |
| 2015/0199035 A1 | 7/2015 | Chang |
| 2015/0253895 A1 | 9/2015 | Kim |
| 2015/0346850 A1 | 12/2015 | Vandermeijden |
| 2016/0070404 A1* | 3/2016 | Kerr ............... G06F 3/0418 345/174 |
| 2016/0091308 A1 | 3/2016 | Oliaei |
| 2016/0162044 A1 | 6/2016 | Ciou |
| 2016/0179249 A1 | 6/2016 | Ballan |
| 2016/0209944 A1 | 7/2016 | Shim |
| 2016/0282965 A1 | 9/2016 | Jensen |
| 2016/0349922 A1 | 12/2016 | Choi |
| 2017/0010697 A1 | 1/2017 | Jiang |
| 2017/0083164 A1 | 3/2017 | Sheng |
| 2018/0032211 A1 | 2/2018 | King |

FOREIGN PATENT DOCUMENTS

| | | |
|---|---|---|
| EP | 2315101 A1 | 4/2011 |
| EP | 2315101 B1 | 1/2014 |
| FR | 2948787 B1 | 2/2011 |
| KR | 20040017272 | 2/2004 |
| KR | 20070005580 | 1/2007 |
| KR | 20080005990 | 1/2008 |
| KR | 20110001839 | 1/2011 |
| WO | WO-03005292 A1 | 1/2003 |
| WO | WO-2006115947 A3 | 6/2007 |
| WO | WO-2011010037 A1 | 1/2011 |
| WO | WO-2011024434 | 3/2011 |
| WO | WO-2011048433 A1 | 4/2011 |
| WO | WO-2011051722 | 5/2011 |
| WO | WO-2012010912 A2 | 1/2012 |
| WO | WO-2014209757 A1 | 12/2014 |
| WO | WO-2015027017 | 2/2015 |

OTHER PUBLICATIONS

T Benedict et al. 'The joint estimation of signal and noise from the sum envelope.' IEEE Transactions on Information Theory 13.3, pp. 447-454. Jul. 1, 1967.

* cited by examiner

200

| $(T_1, R_1)$ | Reference Data |
| --- | --- |
| $(T_2, R_1)$ | Reference Data |
| $(T_3, R_1)$ | Reference Data |

Reference Data for $R_1$ Group

202

| $(T_2, R_2)$ | Reference Data |
| --- | --- |
| $(T_3, R_2)$ | Reference Data |
| $(T_4, R_2)$ | Reference Data |
| $(T_1, R_2)$ | Reference Data |

Reference Data for $R_2$ Group

204

| $(T_4, R_3)$ | Reference Data |
| --- | --- |
| $(T_1, R_3)$ | Reference Data |
| $(T_3, R_3)$ | Reference Data |
| $(T_2, R_3)$ | Reference Data |

Reference Data for $R_3$ Group

Faster (Immediate) Update of Reference Data

Slower (Gradual) Update of Reference Data

UPDATE OF REFERENCE DATA FOR TOUCH INPUT DETECTION

BACKGROUND OF THE INVENTION

Many touch detection systems use reference data to detect when a touch has occurred on a touch surface (e.g., on a tablet or smartphone) and/or an amount of force associated with the touch. Although techniques for updating such reference data exist, new update techniques (e.g., new update criteria for deciding when to update reference data, the manner in which the reference data is updated, the contents or composition of the reference data itself, etc.) would be desirable. Such new update techniques are desirable because they permit faster touch detection and/or a more accurate force estimation.

BRIEF DESCRIPTION OF THE DRAWINGS

Various embodiments of the invention are disclosed in the following detailed description and the accompanying drawings.

FIG. 2 is a diagram illustrating an embodiment of reference data stored for each transmitter-receiver pair of interest.

DETAILED DESCRIPTION

Figure 1A:
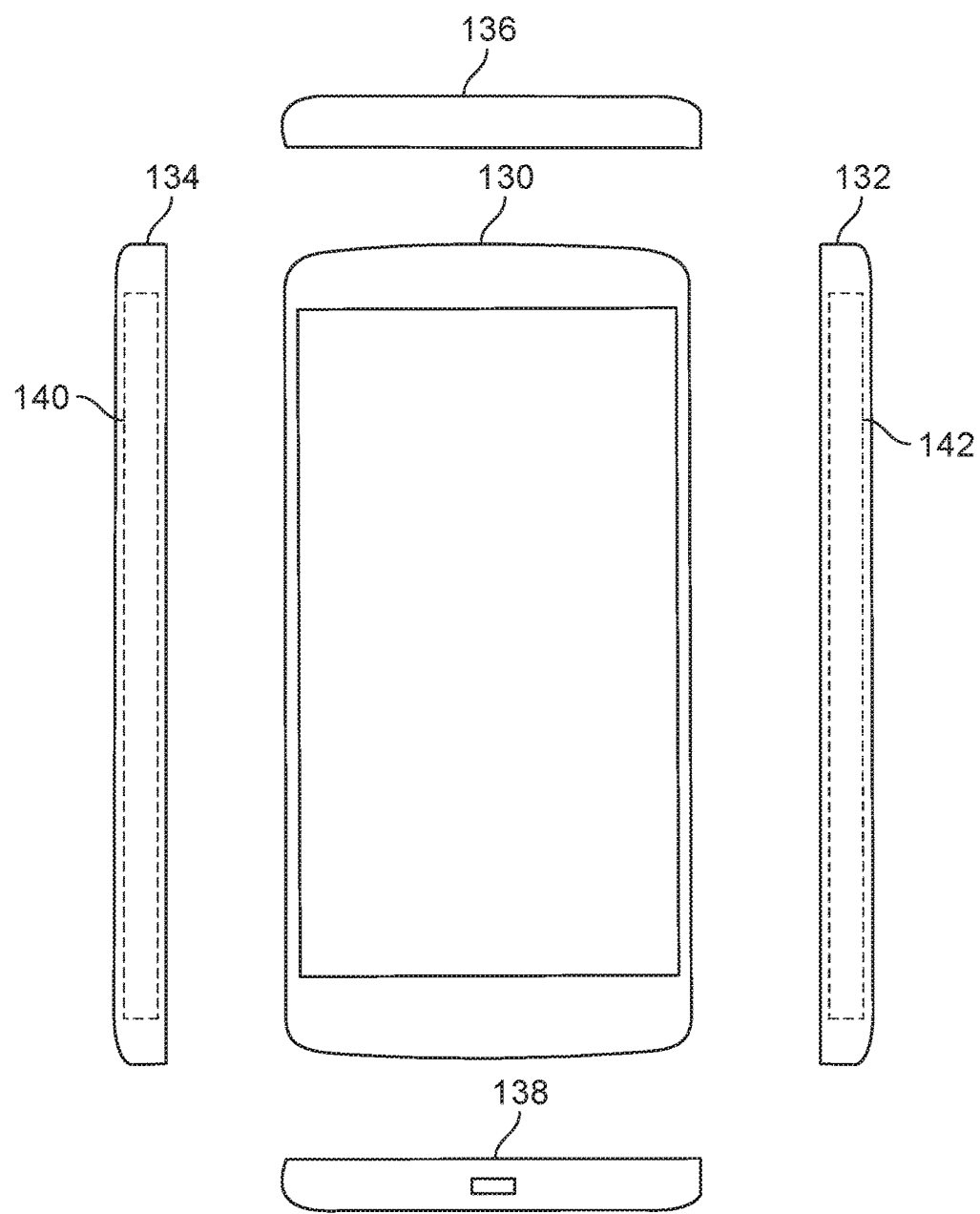
FIG. 1A is a diagram illustrating different views of a device with touch input enabled housing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of techniques to update reference data used in detecting a touch on a touch surface and/or an amount of force are described herein. First, some examples of a touch and force detection system are described in order to provide some reference data examples and examples of how the exemplary reference data is used. Then, various embodiments of update techniques are described (e.g., example criteria about when to update the reference data, example criteria about when to preserve (i.e., not update) the reference data and/or how to update the reference data).

In some embodiments, a plurality of transmitters are coupled to a propagating housing medium and each transmitter is configured to emit a propagating signal through the propagating housing medium. A plurality of receivers are coupled to the propagating housing medium, wherein the receivers detect the propagating signals that have been disturbed by a touch input. The plurality of transmitters and the plurality of receivers are coupled to the propagating medium inline along a one-dimensional axis (e.g., lengthwise) of the propagating housing medium (at least in some embodiments). For example, when the propagating housing medium is touched at a point along the one-dimensional axis, the emitted signal propagating through the propagating housing medium is disturbed (e.g., the touch causes an interference with the propagated signal). By processing the received signals, a location and a force on the surface of the housing associated with the touch input are at least in part identified. Because the interaction between the material of the touch input and the propagated signal is utilized to detect the signal, a mechanical deflection of a sensor is not required to detect either the location or the force of the touch input. For example, the location and the force of a touch input are able to be detected on a rigid metal side of a smartphone without a use of a physical button or a physical strain gauge.

The one-dimensional axis (e.g., associated with a medium through which signals are transmitted and received) is not necessarily limited to plane geometry. In various embodiments, any straight line on a sphere, cylinder, or any other curved surface as a shortest path between two points on the surface, also known as a geodesic, comprises the one-dimensional axis associated with the medium.

In various embodiments, the touch input includes a physical contact to a surface using a human finger, pen, pointer, stylus, and/or any other body parts or objects that can be used to contact or disturb the surface. In some embodiments, the touch input includes an input gesture and/or a multi-touch input. In some embodiments, the received signal is used to determine one or more of the following associated with a touch input: a gesture, a coordinate position, a time, a time frame, a direction, a velocity, a force magnitude, a proximity magnitude, a pressure, a size, and other measurable or derived parameters.

Touch input detection described herein may be utilized to detect touch inputs on non-traditional surfaces such as metal that allows it to have applicability beyond touch screen displays. Various technologies have been traditionally used to detect a touch input on a display area. The most popular technologies today include capacitive and resistive touch detection technology. Using resistive touch technology, often a glass panel is coated with multiple conductive layers that register touches when physical pressure is applied to the layers to force the layers to make physical contact. Using capacitive touch technology, often a glass panel is coated with material that can hold an electrical charge sensitive to a human finger. By detecting the change in the electrical charge due to a touch, a touch location can be detected. However, with resistive and capacitive touch detection technologies, the glass screen is required to be coated with a material that reduces the clarity of the glass screen. Additionally, because the entire glass screen is required to be coated with a material, manufacturing and component costs can become prohibitively expensive as larger screens are desired.

Another type of touch detection technology includes bending wave technology. One example includes the Elo Touch Systems Acoustic Pulse Recognition, commonly called APR, manufactured by Elo Touch Systems of 301 Constitution Drive, Menlo Park, Calif. 94025. The APR system includes transducers attached to the edges of a touchscreen glass that pick up the sound emitted on the glass due to a touch. However, the surface glass may pick up other external sounds and vibrations that reduce the accuracy and effectiveness of the APR system to efficiently detect a touch input. Another example includes the Surface Acoustic Wave-based technology, commonly called SAW, such as the Elo IntelliTouch Plus™ of Elo Touch Systems. The SAW technology sends ultrasonic waves in a guided pattern using reflectors on the surface of the touch screen to detect a touch. However, sending the ultrasonic waves in the guided pattern increases costs and may be difficult to achieve. Additionally, because SAW must propagate on the surface, SAW transmitters and receivers are typically mounted on the same surface where a touch input is to be received. Detecting additional types of inputs, such as multi-touch inputs, may not be possible or may be difficult using SAW or APR technology.

FIG. 1A is a diagram illustrating different views of a device with touch input enabled housing. Front view 130 of the device shows a front display surface of the device. Left side view 134 of the device shows an example touch input external surface region 140 on a sidewall of the device where a touch input is able to be detected. For example, a location and a force of a user touch input are able to be detected in region 140 by detecting disturbances to transmitted signals in region 140. By touch enabling the side of the device, one or more functions traditionally served by physical buttons are able to be provided without the use of physical buttons. For example, volume control inputs are able to be detected on the side without the use of physical volume control buttons. Right side view 132 of the device shows touch input external surface region 142 on another sidewall of the device where a user touch input can be detected. Although regions 140 and 142 have been shown as smooth regions, in various other embodiments one or more physical buttons, ports, and/or openings (e.g., SIM/memory card tray) may exist, or the region can be textured to provide an indication of the sensing region. Touch input detection may be provided over surfaces of physical buttons, trays, flaps, switches, etc. by detecting transmitted signal disturbances to allow touch input detection without requiring detection of physical movement/deflection of a component of the device (e.g., detect finger swiping over a surface of a physical button). In some embodiments, the touch input regions on the sides may be divided into different regions that correspond to different functions. The touch input provided in region 140 (and likewise in region 142) is detected along a one-dimensional axis. For example, a touch location is detected as a position on its lengthwise axis without differentiating the width of the object touching the sensing region. In an alternative embodiment, the width of the object touching the sensing region is also detected. Regions 140 and 142 correspond to regions beneath which touch input transmitters and sensors are located. Although two touch input regions on the housing of the device have been shown in FIG. 1A, other touch input regions on the housing may exist in various other embodiments. For example, surfaces on top (e.g., surface on top view 136) and/or bottom (e.g., surface on bottom view 138) of the device are touch input enabled. The shapes of touch input surfaces/regions on device sidewalls (e.g., regions 140 and 142) may be at least in part flat, at least in part curved, at least in part angular, at least in part textured, and/or any combination thereof.

Figure 1B:
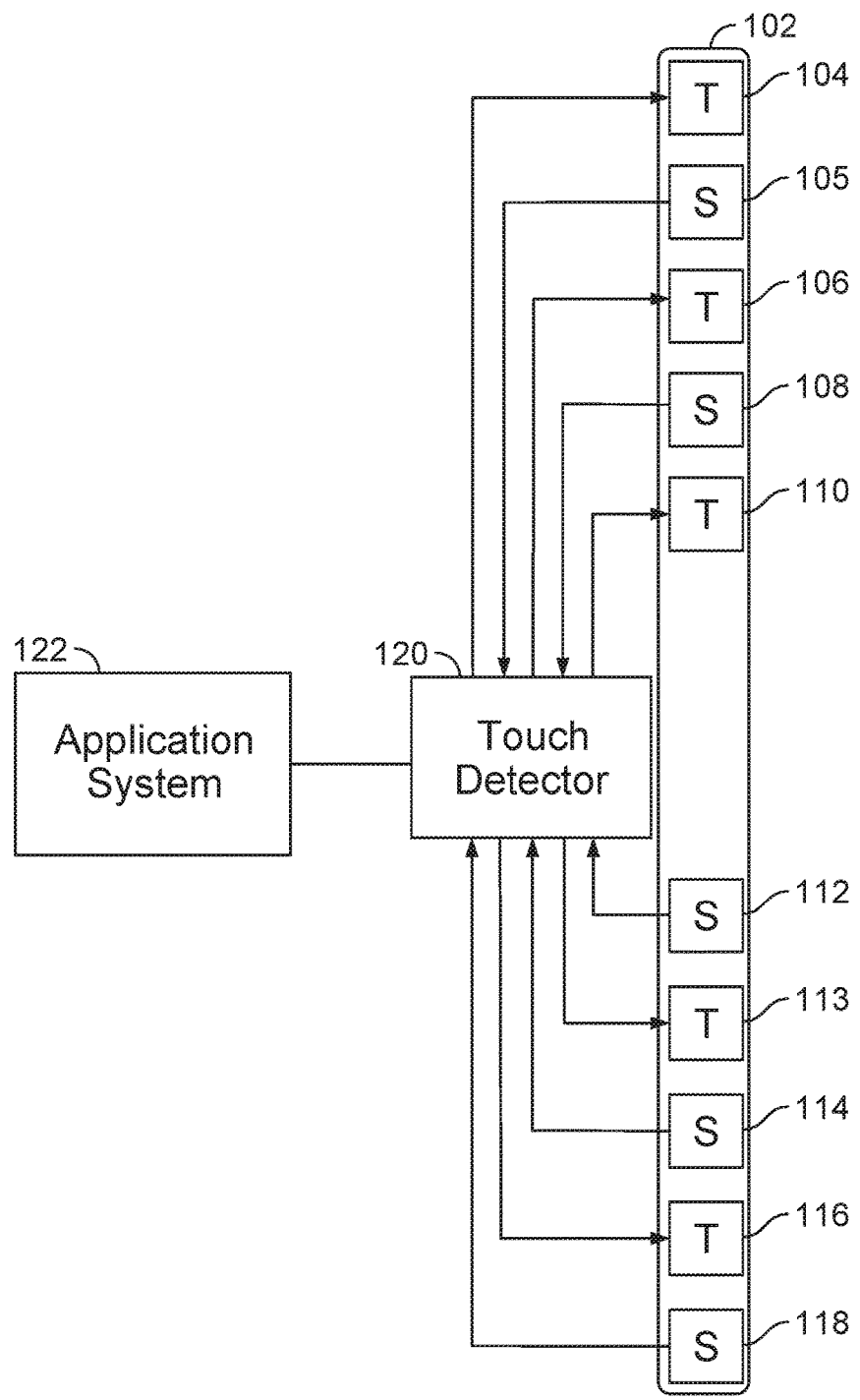
FIG. 1B is a block diagram illustrating an embodiment of a system for detecting a touch input surface disturbance.

FIG. 1B is a block diagram illustrating an embodiment of a system for detecting a touch input surface disturbance. In some embodiments, the system shown in FIG. 1B is included in the device shown in FIG. 1A. For example, FIG. 1B shows components utilized to detect a touch input on a sidewall external surface 140 of FIG. 1A. In some embodiments, the system shown in FIG. 1B is included in a computing device, an entertainment device, a smartphone, a tablet computer, a point of sale terminal, a food and restaurant apparatus, a gaming device, a casino game and application, a piece of furniture, a vehicle, an industrial application, a financial application, a medical device, an appliance, and any other objects or devices having a touch input surface. Propagating signal medium 102 is coupled to transmitters 104, 113, 106, 116, and 110 and receivers/sensors 105, 108, 112, 114 and 118. The locations where transmitters 104, 113, 106, 116, and 110 and sensors 105, 108, 112, 114 and 118 are located with respect to propagating signal medium 102 and with respect to each other, as shown in FIG. 1B, are merely an example. Likewise, the number of transmitters and receivers need not be equal. In some embodiments, propagating signal medium 102 is a part of a housing of a device. For example, the transmitter and receivers are coupled to a sidewall of a housing of a smartphone device to detect touch inputs on the side of the device. In some embodiments, the shown portion of propagating signal medium 102 corresponds to touch input region 140 of FIG. 1A. For example, the shown elongated region of medium 102 corresponds to a region of a side of a smartphone device where touch input is able to be provided.

Other configurations of transmitter and sensor locations may exist in various embodiments. Although FIG. 1B shows alternating transmitters and receivers arranged inline, locations of transmitters and sensors may be intertwined and spaced and arranged in any configuration in various other embodiments. The gap between transmitter 110 and sensor 112 may correspond to a location where a SIM/memory card opening is to be located. Any number of transmitters and/or sensors may be utilized in various embodiments. In some embodiments, rather than using a dedicated transmitter and a dedicated sensor, a transducer that acts as both a transmitter and a sensor is utilized. In various embodiments, the propagating medium includes one or more of the following materials: polymer, plastic, wood, steel, metal and any medium that is able to propagate an acoustic or ultrasonic signal. For example, medium 102 is a portion of a metal sidewall/side-edge of a smartphone or a tablet computer device where a user is to hold the device. FIG. 1B only shows transmitters and sensors for one side of a device as an example and another set of transmitters and sensors may be placed on another side of the device to detect inputs on this other side of the device (e.g., also connected to touch detector 120). Objects of FIG. 1B are not drawn to scale.

Medium 102 includes a surface area where a user may touch to provide a command input. In various embodiments, the touch input surface of medium 102 is flat, curved, or combinations thereof. The touch input is to be detected along a lengthwise region (e.g., locations in the region to be only identified along a one-dimensional axis). A one-dimensional location and a force of a touch input along an external sidewall surface of the device may be detected without actuation of a physical button or use of any other sensor that requires a physical deflection/movement of a component of the device. For example, a user provides an input on the external surface of medium 102 that covers the shown transmitters and receivers that are mounted on an opposite internal surface/side of medium 102 (e.g., mounted on an internal side of device sidewall inside a device and the touch input is provided on the other side of the device sidewall that is the external surface of the device sidewall) and the input disturbs a transmitted signal traveling within medium 102 (e.g., by at least one of the shown transmitters) that is detected (e.g., by at least one of the shown sensors) and analyzed to identify a location on the external surface of medium 102 where the input was provided. This allows virtual buttons to be provided on a smooth side surface and an indication of a virtual button press is detected when a user applies pressure of sufficient force at a specific location of a virtual button on the side surface region. In some embodiments, a length of the axis where a touch input is able to be detected starts from an external surface over a mounting location of transmitter 104 to an external surface over a mounting location of sensor 118.

Examples of transmitters 104, 106, 110, 113 and 116 include piezoelectric transducers, electromagnetic transducers, transmitters, sensors, and/or any other transmitters and transducers capable of propagating a signal through medium 102. Examples of sensors 105, 108, 112, 114 and 118 include piezoelectric transducers, electromagnetic transducers, laser vibrometer transmitters, and/or any other sensors and transducers capable of detecting a signal on medium 102. Although five transmitters and five sensors are shown, any number of transmitters and any number of sensors may be used in other embodiments. In the example shown, transmitters 104, 106, 110, 113 and 116 each may propagate a signal through medium 102. A signal emitted by a transmitter is distinguishable from another signal emitted by another transmitter. In order to distinguish the signals, a phase of the signals (e.g., code division multiplexing), a frequency range of the signals (e.g., frequency division multiplexing), or a timing of the signals (e.g., time division multiplexing) may be varied. One or more of sensors 105, 108, 112, 114 and 118 receive the propagated signals.

Touch detector 120 (e.g., included and mounted on an internal circuit board) is connected to at least the transmitters and sensors shown in FIG. 1B. In some embodiments, detector 120 includes one or more of the following: an integrated circuit chip, a printed circuit board, a processor, and other electrical components and connectors. Detector 120 determines and sends signals to be propagated by transmitters 104, 106, 110, 113 and 116. Detector 120 also receives the signals detected by sensors 105, 108, 112, 114 and 118. The received signals are processed by detector 120 to determine whether a disturbance associated with a user input has been detected at a location on a surface of medium 102 associated with the disturbance. Detector 120 is in communication with application system 122. Application system 122 uses information provided by detector 120. For example, application system 122 receives from detector 120 a location identifier and a force identifier associated with a user touch input that is used by application system 122 to control configuration, setting or function of a device, operating system and/or application of application system 122. For example, a user indication to increase volume is detected when a touch input of sufficient pressure is detected within one range of locations along a one-dimensional axis, while a user indication to decrease volume is detected when an input of sufficient pressure is detected within another range of locations. Such regions can be fixed, or can be defined in software. For example, a right-handed user could have a region to change volume assigned to the detection region on the left side of the case, whereas a left-handed user could reverse this assignment.

In some embodiments, application system 122 includes a processor and/or memory/storage. In other embodiments, detector 120 and application system 122 are at least in part included/processed in a single processor. An example of data provided by detector 120 to application system 122 includes one or more of the following associated with a user indication: a location coordinate along a one-dimensional axis, a gesture, simultaneous user indications (e.g., multi-touch input), a time, a status, a direction, a velocity, a force magnitude, a proximity magnitude, a pressure, a size, and other measurable or derived information.

Figure 1C:
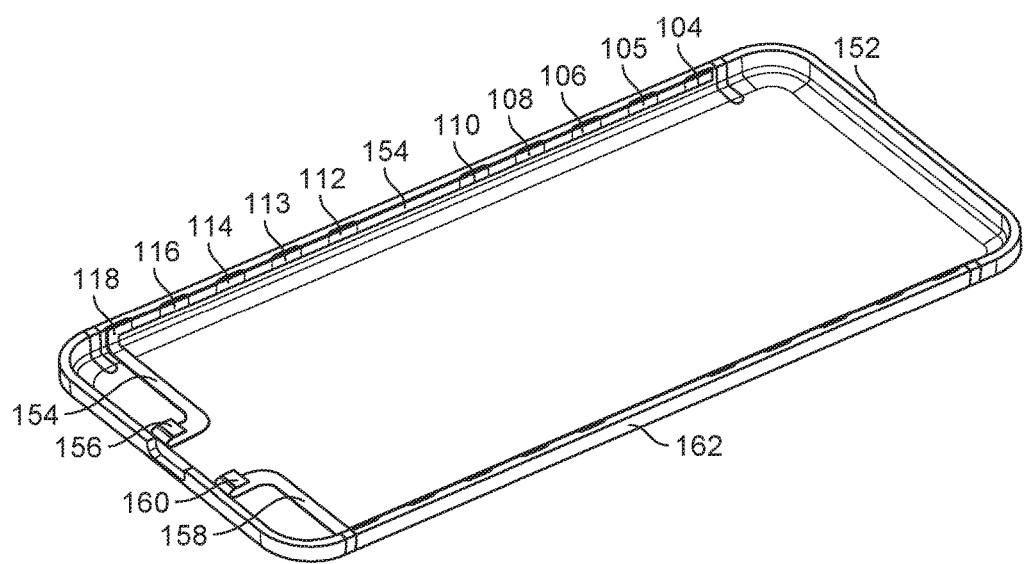
FIG. 1C is a diagram illustrating an embodiment of a device housing with touch input enabled sides.

FIG. 1C is a diagram illustrating an embodiment of a device housing with touch input enabled sides. Housing 152 shows a unibody back and side housing of an electronic device. For example, housing 152 may be utilized as a part of a housing for a smartphone device that houses electrical components and is covered with a display glass surface.

Transmitters 104, 106, 110, 113 and 116 and sensors 105, 108, 112, 114 and 118 (also shown in FIG. 1B) have been mounted on an internal side/surface of a sidewall (e.g., sidewall internal surface/side facing inside the electronic device) of housing 152. Housing 152 may be made of metal (e.g., aluminum), plastics, ceramics, carbon fiber, or any other material of propagating medium 102 of FIG. 1B. The transmitters and sensors are mounted on flex cable 154. Flex cable 154 includes patterned conductors that connect the transmitters and sensors/receivers to pins on connector 156. In some embodiments, connector 156 connects to a circuit board (not shown) that includes a touch detector (e.g., touch detector 120) that provides/receives signals to/from the transmitters/receivers. The transmitters and sensors/receivers of flex cable 154 are utilized to detect touch input on an external side surface of housing 152 over the region directly above and between the transmitters and sensors/receivers of flex cable 154 (e.g., to detect location and force along a one-dimensional axis identifying lengthwise locations on the external side surface). This allows the side surface of housing 152 to be touch sensitive to user inputs. Although housing 152 does not show any physical buttons in the touch input surface, in various other embodiments, one or more physical buttons may exist. For example, touch input detection may be provided on a surface of a physical button (e.g., transmitter/sensor mounted behind/around a physical button) to allow a user to provide a touch indication over a surface of a physical button without physically actuating the physical button (e.g., detect swipe gesture over physical button).

Much like flex cable 154, flex cable 158 connects transmitters and sensors mounted on a second internal surface/side of a second sidewall (e.g., sidewall internal surface/side facing inside cavity of the electronic device) to connector 160 (e.g., connects to the circuit board that includes touch detector 120 of FIG. 1B). The transmitters and sensors/receivers of flex cable 158 are utilized to detect touch input on external side surface 162 of housing 152 over the region directly above and between the transmitters and sensors/receivers of flex cable 158. This allows sidewall surface 162 to be touch sensitive to user inputs. In various embodiments, other transmitters and sensors/receivers may be mounted on other internal walls and surfaces of housing 152 to allow touch inputs on other external surfaces of housing 152.

Figure 1D:
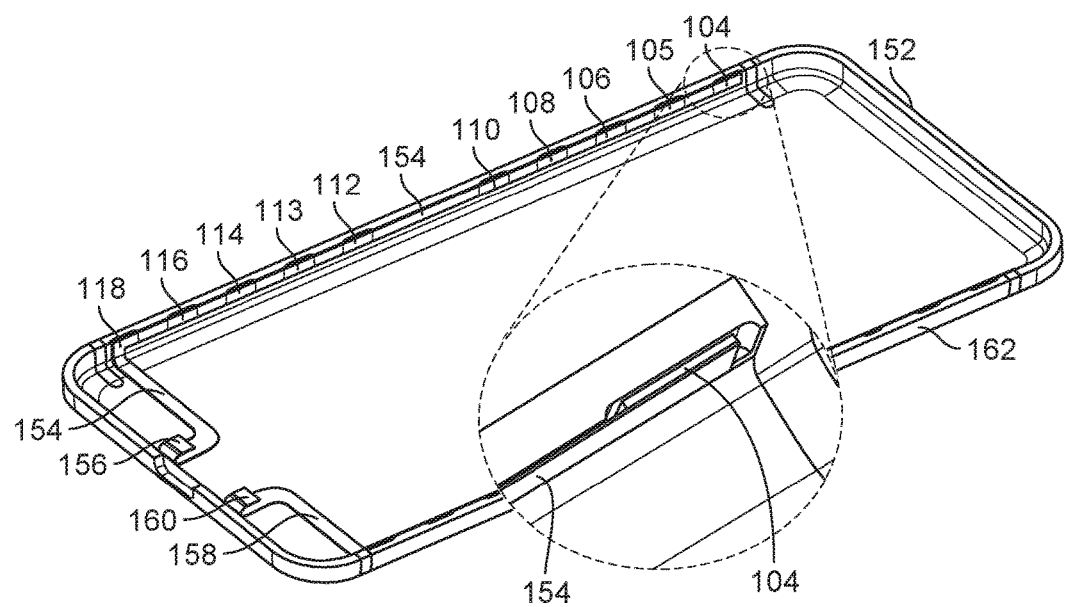
FIG. 1D shows a magnified view of a cavity/pocket embodiment.
Figure 1E:
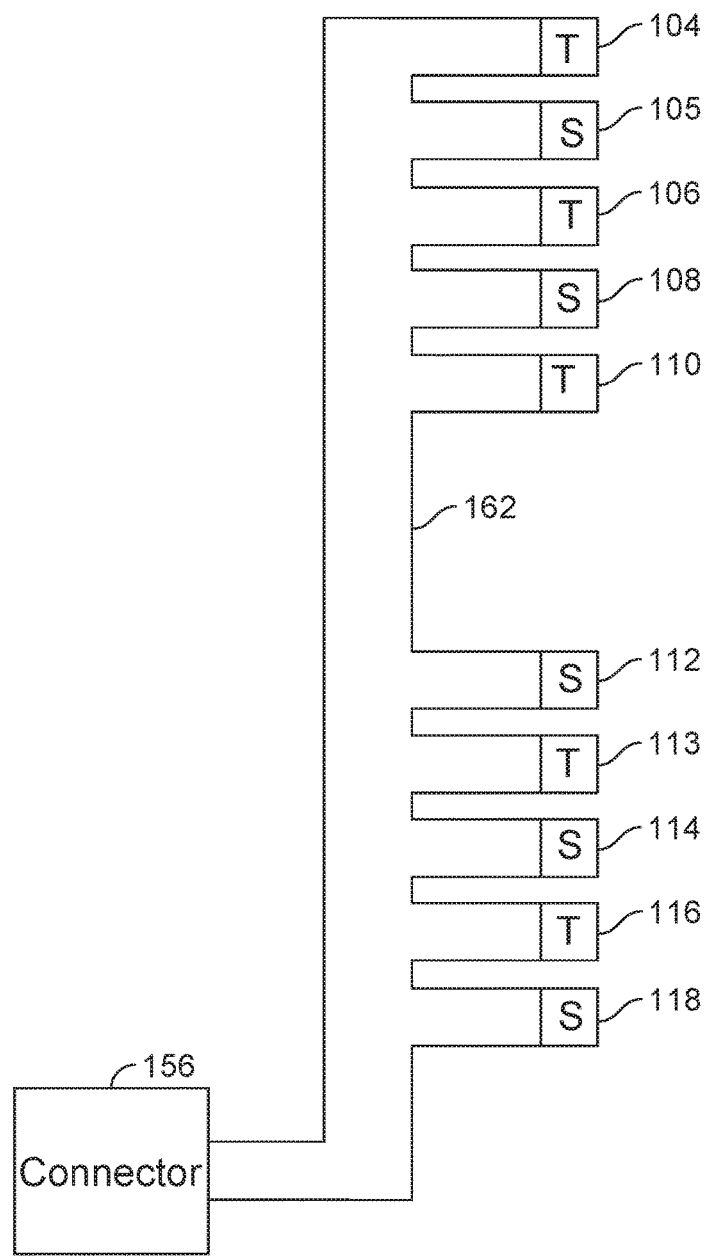
FIG. 1E shows embodiments of transmitters and receivers mounted on fingers of a flex cable.

Although the shown transmitters and sensors/receivers have been directly mounted on flex cable 154 in a straight line along a strip/bar of flex cable 154, the sensors/receivers and transmitters may be mounted on a flex cable in various other embodiments. For example, FIG. 1E shows transmitters and receivers mounted on fingers of flex cable 162. This may allow flexibility in routing the flex cable around other internal components of a device. For example, the fingers allow the flex cable to be routed around openings and components to accommodate a switch, button, SIM/memory card tray, etc.

When manufacturing the configuration shown in FIG. 1C, it may be inefficient to individually attach each individual transmitter/sensor onto a flex cable. In some embodiments, transmitters and sensors are positioned/placed on a stiffener bar (e.g., mounting template bar) that assists in the positioning and alignment of the transmitters and sensors and all of the transmitters and sensors on the stiffener bar are attached to a flex cable together at the same time using the stiffener bar. Once transmitters/sensors are attached to the flex cable, each of the transmitters/sensors on the flex cable are attached to the propagating medium/housing via an adhesive (e.g., epoxy). The transmitters and sensors shown in the example of FIG. 1C have been placed inside cavities/pockets etched on the internal side/surface of sidewall of housing 152. FIG. 1D shows a magnified view of the cavity/pocket (e.g., 0.3 millimeter in depth). By placing each transmitter/sensor in the cavity, valuable internal space inside the housing is maintained and the flex cable assembly with the transmitters and receivers is able to be mounted flush to the sidewall.

Figure 1F:
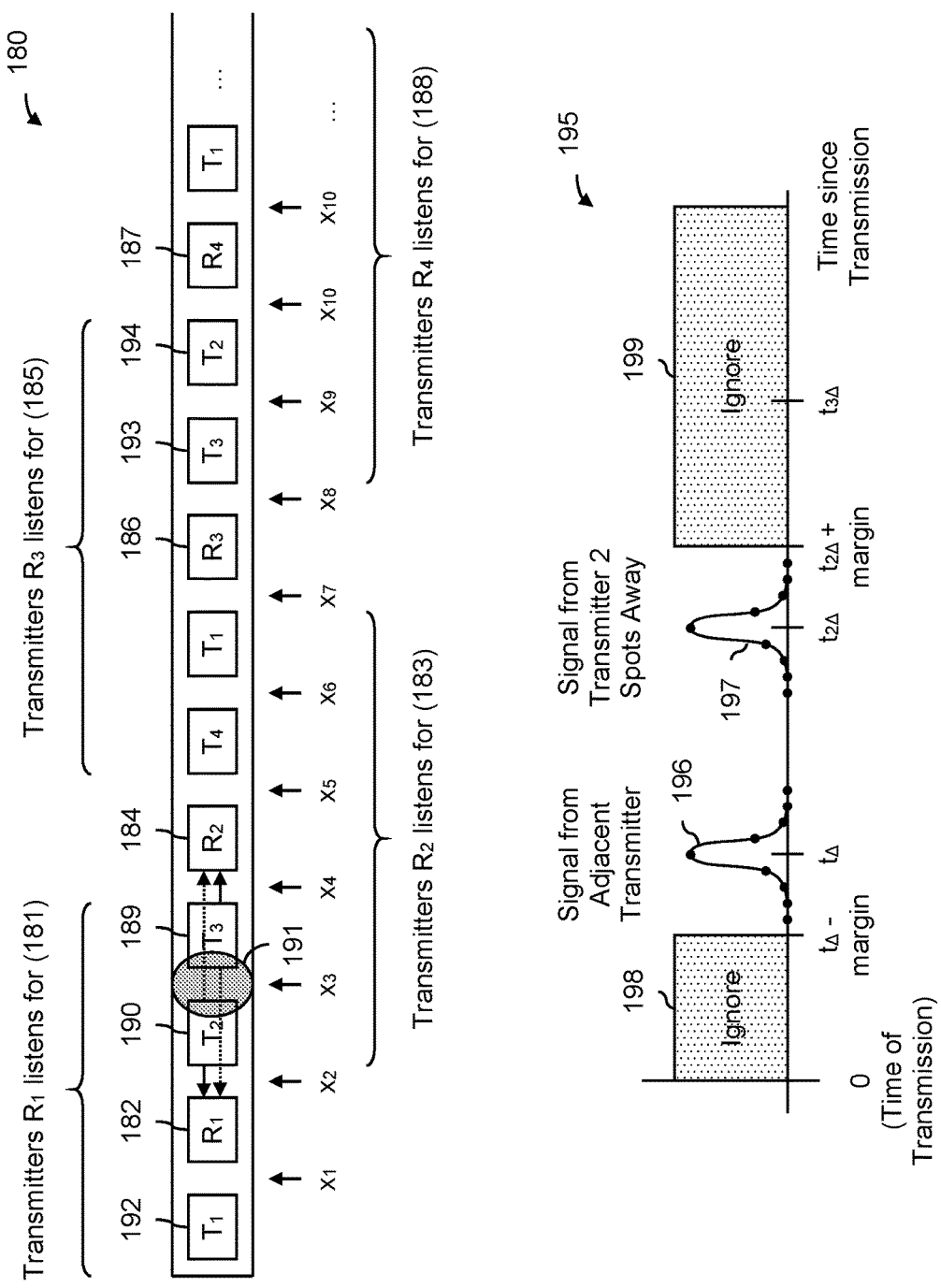
FIG. 1F is a diagram illustrating an embodiment of a side of a phone with multiple transmitters and multiple receivers.

FIG. 1F is a diagram illustrating an embodiment of a side of a phone with multiple transmitters and multiple receivers. Diagram 180 shows the exemplary transmitters and receivers laid out along the side of a phone. In this example, each receiver is associated with and listens to some number of transmitters. Group 181 shows the transmitters that receiver $R_1$ (182) listens for, group 183 shows the transmitters that receiver $R_2$ (184) listens for, group 185 shows the transmitters that receiver $R_3$ (186) listens for, and group 188 shows the transmitters that receiver $R_4$ (187) listens for.

In this example, the transmitters and receivers are configured to exchange an acoustic or ultrasonic signal. Such signals may be desirable because they work well in a variety of propagating mediums, including ones that have not worked well with previous touch and/or force sensing techniques. For example, the sides of some phones are made of metal, which does not work well with existing touch and/or force sensors which rely upon capacitors (e.g., because of the stiffness of the metal and/or the conductive properties of the metal). In contrast, acoustic or ultrasonic signals can propagate through metal relatively easily. In some embodiments, piezoelectric transducers are used for the transmitters and/or receivers.

In this example, transmitters with the same index use the same time-shifted pseudorandom binary sequence to transmit their signal. That is, all $T_1$ transmitters use a pseudorandom binary sequence with a first time shift, all $T_2$ transmitters the same pseudorandom binary sequence but with a second time shift, and so on. Using time-shifted pseudorandom binary sequences permits orthogonality between transmitters with different indices and other techniques to provide orthogonality between transmitters with different indices may be used.

To ensure that only the appropriate signals from the appropriate transmitters are analyzed downstream, in some embodiments, filtering (e.g., based on propagation time) is performed so that signals from more distant transmitters (e.g., which are not part of a receiver's group) are ignored. Diagram 195 shows an example of the filtering performed to filter out signals transmitted by transmitters which are not of interest to a given receiver. For clarity and ease of explanation, suppose that all of the transmitters transmit at time 0. The propagation medium and its properties are known ahead of time (e.g., it is known that the side of a phone will be made of metal) and so the propagation time of a signal from a given transmitter to a given receiver is known. As used herein, $t_A$ is the propagation time of a signal from a transmitter to an adjacent receiver (e.g., from transmitter $T_3$ (189) to receiver $R_2$ (184)). Similarly, $t_{2A}$ is the propagation time of a signal from a transmitter to a receiver which is two places or spots away (e.g., from transmitter $T_2$ (190) to receiver $R_2$ (184)).

Again for clarity and ease of explanation, the transmission signals (196 and 197) in this example are represented as relatively short pulses; note that they occur or otherwise arrive at time $t_A$ and $t_{2A}$. Given the propagation times described above, the signal (196) from an adjacent transmitter (e.g., from $T_3$ (189) to receiver $R_2$ (184)) arrives at the receiver at time $t_A$. The signal (197) from a transmitter two spots away arrives at the receiver at time $t_{2A}$ (e.g., from transmitter $T_2$ (190) to receiver $R_2$ (184)).

As shown in diagram 195, filtering (198) is performed from time 0 to time ($t_A$−margin). Filtering (199) is also performed from time ($t_{2A}$+margin) onwards. This causes any signal received before ($t_{2A}$+margin) or after ($t_{2A}$+margin) to be ignored. As a result, only signals which are receive between $t_A$ (minus some margin) and $t_{2A}$ (plus some margin) are further analyzed and/or processed by downstream processing.

This filtering helps to prevent a signal from a distant transmitter (e.g., which is not part of a receiver's group) from being analyzed. For example, this filtering may prevent receiver $R_3$ (186) from analyzing the signal from transmitter $T_2$ (190), which is not in that receiver's group. It may also prevent a receiver from passing on (e.g., to a downstream block or process) a reflected signal which is reflected off the edge of the propagation medium. Generally speaking, filtering helps to prevent the introduction of noise and improves the quality of the sensing and/or simplifies the signal processing.

The following figure shows an example of reference data which is stored by the system and used to detect a touch (e.g., touch 191) and/or an amount of force (e.g., how much force is applied at touch 191).

FIG. 2 is a diagram illustrating an embodiment of reference data stored for each transmitter-receiver pair of interest. In the example shown, table 200 shows reference data associated with the $R_1$ group (181) from FIG. 1F. As shown in FIG. 1F, the $R_1$ group includes three transmitter-receiver pairs: ($T_1$, $R_1$), ($T_2$, $R_1$), and ($T_3$, $R_1$). In this example, the reference data stored for a given transmitter-receiver pair includes or is otherwise based on one or more previously received signals exchanged between that transmitter-receiver pair. For example, suppose signal 196 in diagram 195 in FIG. 1F is a signal exchanged between the ($T_1$, $R_1$) transmitter-receiver pair and the system decides to save that signal as reference data for that pair. The dots (i.e., digital samples) superimposed on signal 196 are an example of the reference data that is stored for the ($T_1$, $R_1$) transmitter-receiver pair. Due to storage limitations, an infinite number of digital samples cannot be stored and in the example of diagram 195 in FIG. 1F, 9 digital samples (i.e., the dots shown) are stored as reference data for each transmitter-receiver pair.

Tables 202 and 204 show reference data for other groups. Table 202 shows reference data stored for transmitter-receiver pairs in the $R_2$ group (i.e., group 183 in FIG. 1F) and table 204 shows reference data stored for transmitter-receiver pairs in the $R_3$ group (i.e., group 185 in FIG. 1F). It is noted that for transmitter-receiver pairs where the receiver does not listen for the transmitter (e.g., receiver $R_1$ 182 does not listen for transmitter $T_3$ 193 in FIG. 1F), reference data is not stored for such transmitter-receiver pairs.

In addition to storing (e.g., separately or independently) reference data for each transmitter-receiver pair of interest, the decision making about when to update reference data operates independently. So, although the system may decide to update reference data for one transmitter-receiver pair, it may at the same time decide not to update reference data for another transmitter-receiver pair. Storing reference data for each transmitter-receiver pair and updating the reference data independently permits the system to adapt to localized events which in turn permits the system to more accurately and/or more quickly detect touch and/or an amount of force. For example, a touch may occur at some gap locations but not others, and it may be desirable to update some gap locations but not others. Or, some gap locations may be warmer than others which causes the signal, transmitter(s), and/or receiver(s) in that area to behave differently than in a colder gap locations. And some piezo transducers (e.g., which may be used to implement the transmitters and/or receivers) may be slower and/or weaker than other piezo transducers.

In some embodiments, the stored reference data includes amplitude as well as phase information. For example, some touch and/or force detection systems use both amplitude as well as phase information to detect a touch and/or determine an amount of force applied. In some embodiments (described in more detail below), phase information is used to decide when or if to update reference data.

The following figure describes an example of how a touch is detected using reference data.

Figure 3:
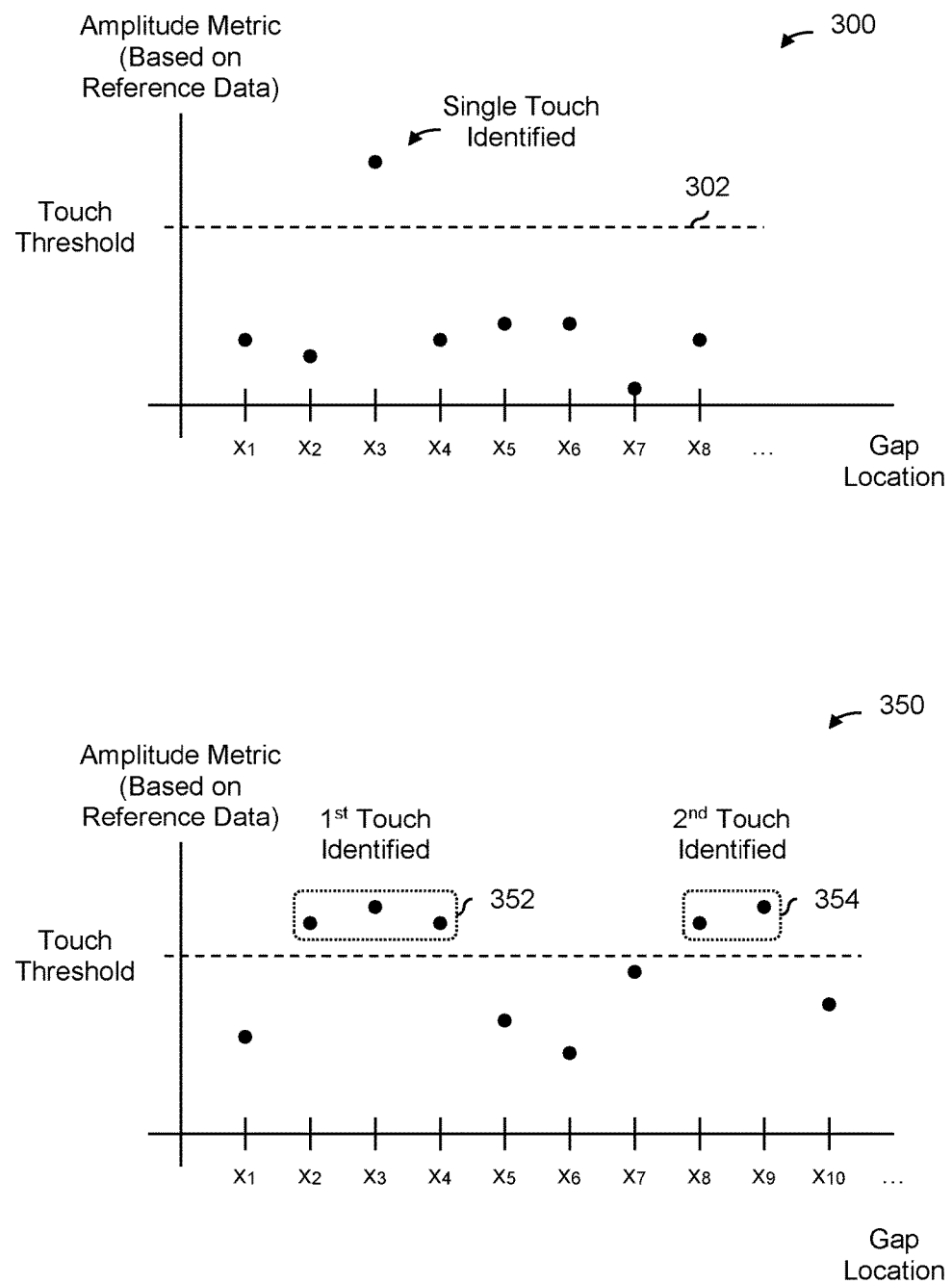
FIG. 3 is a diagram illustrating some embodiments of touches identified using reference data.

FIG. 3 is a diagram illustrating some embodiments of touches identified using reference data. In the example shown, diagram 300 corresponds to the example of FIG. 1F. The amplitude metric for each gap location (e.g., $x_1$, $x_2$, etc.) is plotted in this diagram, so that the x-axis corresponds to a particular gap location and the y-axis corresponds to the amplitude metric calculated for that particular gap.

In FIG. 1F, $x_1$ corresponds to the gap between transmitter $T_1$ (192) and receiver $R_1$ (182), $x_2$ corresponds to the gap between receiver $R_1$ (182) and transmitter $T_2$ (190), and so on. In this example, the amplitude metric calculated for gap location $x_1$ is:

$$x_1 = T_1 R_1$$

where (generally speaking) $T_i R_j$ is a metric or value associated with a degree of change (if any) of an (e.g., current or new) amplitude compared to some amplitude reference. More specifically:

$$T_i R_j = 10 \log_{10} \left| \frac{\text{Amplitude}_{new}}{\text{Amplitude}_{reference}} \right|.$$

In some embodiments, the amplitude reference value (e.g., in the above $T_i R_j$ equation) is the largest or maximum amplitude from the reference data for that particular transmitter-receiver pair. For example, in diagram 195 in FIG. 1F, if the dots superimposed on signal 196 correspond to the reference data stored for a given transmitter-receiver pair, then the amplitude reference value is the amplitude or value corresponding to the dot at the peak of signal 196.

Returning to diagram 300 in FIG. 3, the amplitude metrics for other gaps may be calculated as follows:

$$x_2 = \frac{1}{2}(T_2 R_1 + (T_3 R_1 - (T_2 R_2 - T_3 R_2))) = \frac{1}{2}(T_2 R_1 + T_3 R_1 - T_2 R_2 + T_3 R_2)$$

$$x_3 = \frac{1}{2}((T_2 R_2 - T_3 R_2) + (T_3 R_1 - T_2 R_1))$$

$$x_4 =$$
$$\frac{1}{2}(T_3 R_2 + (T_2 R_2 - (T_3 R_1 - T_2 R_1))) = \frac{1}{2}(T_3 R_2 + T_2 R_2 - T_3 R_1 + T_2 R_1)$$

where $T_i R_j$ is calculated as described above.

It may be useful to discuss the $x_3$ equation in more detail in order to obtain insight into how the $x_2$ and $x_4$ equations are obtained. The two signals which pass through the $x_3$ gap are the $T_2 R_2$ signal and the $T_3 R_1$ signal. Therefore, it makes sense to use those signals in calculating a metric or value for $x_3$. However, both of those signals are two-gap signals but only the $x_3$ gap is of interest. Therefore, some part of those signals should be discounted or otherwise removed. For the $T_2R_2$ signal, this can be done by subtracting out $T_3R_2$, since that signal is a one-gap signal and exactly matches the part of the $T_2R_2$ signal which is trying to be removed or discounted. This produces the $(T_2R_2-T_3R_2)$ part of the $x_3$ equation above. Similarly, the $T_2R_1$ signal exactly matches the part of the $T_3R_1$ signal which is trying to be removed or discounted, and $T_2R_1$ can be subtracted from $T_3R_1$. This produces the $(T_3R_1-T_2R_1)$ part of the $x_3$ equation above.

The $x_3$ equation above also has a scaling factor of ½. This is to normalize $x_3$ to match the $x_1$ which only has a contribution from a single transmitter-receiver pair. To put it another way, without the scaling factor, the $x_1$ and $x_3$ calculations would have different dynamic ranges. Conceptually, two one-gap signals are being added together in the $x_3$ equation, where $(T_2R_2-T_3R_2)$ comprises one of the one-gap signals and $(T_3R_1-T_2R_1)$ comprises the other one-gap signal. In contrast, the x1 equation only has a contribution from one one-gap signal.

This logic may be used to construct the $x_2$ and $x_4$ equations above. For the $x_2$ gap, the two signals which pass through that gap are the $T_2R_1$ signal and the $T_3R_1$. The former signal is a one-gap signal and therefore may be used as-is. However, the $T_3R_1$ signal is a two-gap signal and part of it must be subtracted out. The $T_2R_2$ signal is close, but it is not perfect because it is itself a two-gap signal. However, if the $T_3R_2$ signal is subtracted from $T_2R_2$, then that difference (i.e., $T_2R_2-T_3R_2$) may be subtracted from $T_3R_1$. This produces the $T_3R_1-(T_2R_2-T_3R_2)$ part of the $x_2$ equation. For the reasons described above, the $x_2$ equation includes a ½ scaling factor. The $x_4$ equation can be constructed in a similar manner.

It is noted that the above equations are one example of a way to solve the problem of converting measurements $\{T_iR_j\}$ to segment values $\{x_k\}$. In some embodiments, some other equations are used. For example, different weights can provide other unbiased solutions, perhaps with different statistical variances. For example:

$$x_2 = \frac{3}{4}T_2R_1 + \frac{1}{4}T_3R_1 - \frac{1}{4}T_2R_2 + \frac{1}{4}T_3R_2.$$

With the amplitude metrics calculated and plotted, a touch threshold (302) is used to identify any touches. In the example of diagram 300, the only gap location which has an amplitude metric greater than threshold 302 is $x_3$. As such, a single touch at the $x_3$ gap is identified. In this example, the force value which is output for this identified touch is the amplitude metric calculated for $x_3$.

Diagram 350 shows another scenario (e.g., not corresponding to FIG. 1F) where two touches are identified. As described above, the amplitude metrics for the gaps between transmitters and/or receivers are calculated and plotted. In this example, two touches are identified: a first touch (352) at the $x_2$, $x_3$, and $x_4$ gaps and a second touch (354) at the $x_8$ and $x_9$ gaps. In this example, the largest amplitude metric for each touch is output as the force value for that touch. This means outputting the value calculated for $x_3$ as the force value for the first touch and outputting the value for $x_9$ as the force value for the second touch. In some embodiments, the sum of the values above the threshold is output as the force of the touch.

The following figure describes an example receive path which includes reference storage for storing reference data.

Figure 4:
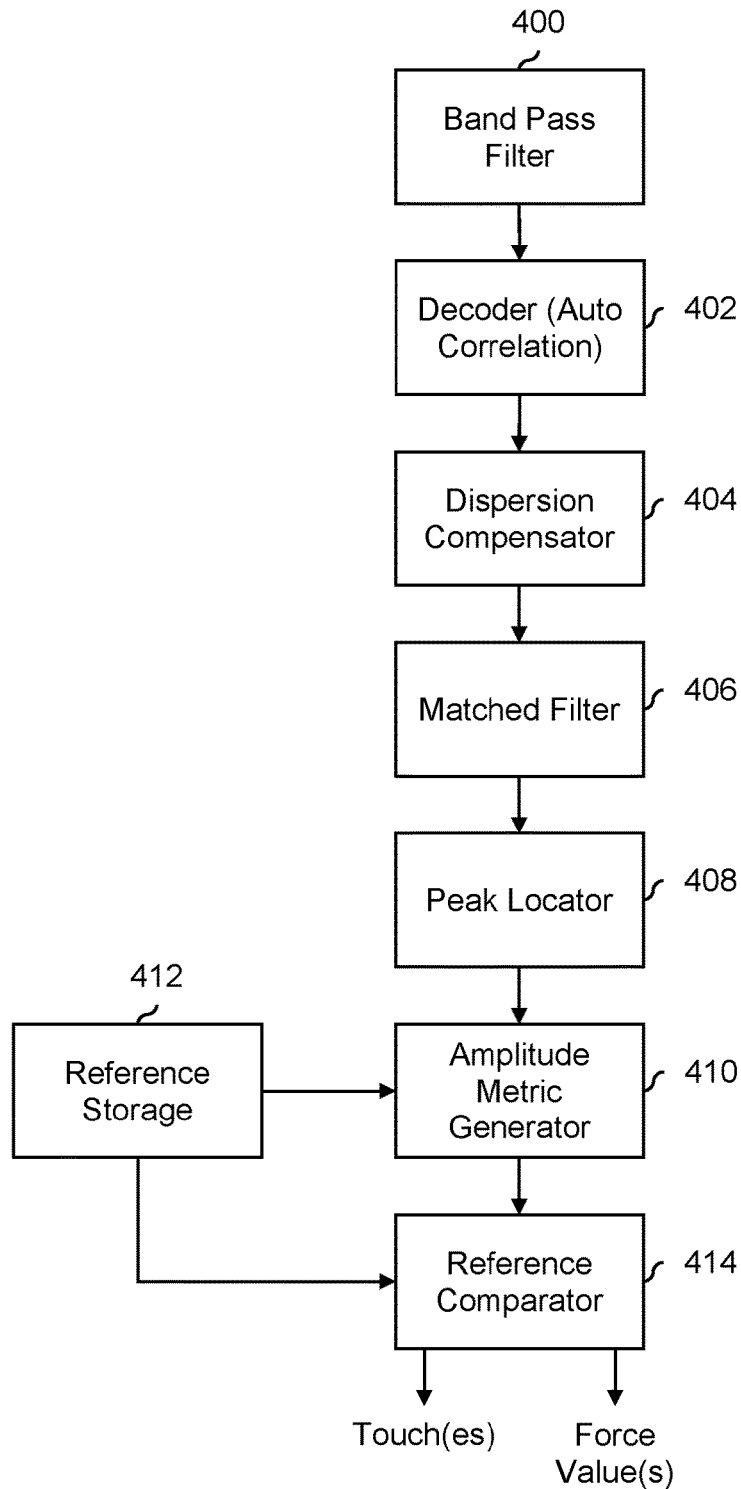
FIG. 4 is a block diagram illustrating an embodiment of a touch and force sensing system.

FIG. 4 is a block diagram illustrating an embodiment of a touch and force sensing system. For brevity and readability, some components, such as an analog-to-digital converter and transformers to change the signal from time-domain to frequency-domain (or vice versa), are not shown here. Among other things, these exemplary components show some of the pre-processing performed before the amplitude of a signal is used to detect a touch and/or estimate an amount of force. In some embodiments, the exemplary blocks shown are implemented on a touch and force sensor and/or on a processor (e.g., an FPGA, an ASIC, or a general purpose processor). Depending on the medium, some embodiments may choose to not utilize some blocks (e.g. matched filter, dispersion compensation, etc.).

Band pass filter 400 is used to filter out information outside of some band pass range. For example, the transmitter may transmit information in some pre-defined range of (e.g., carrier and/or code) frequencies. At the receiver, any signal outside of this range is filtered out in order to reduce the amount of noise or error.

Next, decoding (402) is performed. As described above, time-shifted versions of the same pseudorandom binary sequence are used by the different transmitter indexes (e.g., $T_1$, $T_2$, etc.) to create orthogonality between the different transmitters and/or transmitted signals. Decoding in this example includes performing a correlation with the transmitted signal. In the example of FIG. 1F, if the signal received by receiver $R_2$ (184) is decoded, performing a correlation will produce four distinct peaks corresponding to transmitter $T_2$ (190), another corresponding to transmitter $T_3$ (189), and so on.

With ultrasonic signals, different frequencies travel through the medium at different speeds. So, at the receiver, higher frequencies arrive before slower frequencies, which results in a "smeared" signal at the receiver. The dispersion compensator (404) compensates for this so higher frequencies and lower frequencies which left the transmitter at the same time but arrived at different times are aligned again after compensation.

The peaks (e.g., after decoding and dispersion compensation) are expected to have a certain curved shape. Matched filter 406 filters out parts of the peaks outside of this ideal curved shape, again to reduce noise or errors.

Peak locator 408 finds the location of the peaks in the signal. For example, if there are four known peaks, then the locations or offsets of the peaks in the signals may be identified. The locations or offsets of the peaks are then passed to amplitude metric generator (410), which takes the absolute value of the signal at those locations or offsets and then uses the absolute values to generate an amplitude metric for each gap (e.g., $x_1$, $x_2$, $x_3$, etc.). As described above, amplitude metric generator 410 also inputs the appropriate amplitude reference from reference storage 412 (e.g., depending upon the relevant transmitter-receiver pair(s)) in order to generate the amplitude metrics. The amplitude references (or, more generally, reference data) stored in reference storage 412 may be updated as appropriate. Referring back to FIG. 2, in some embodiments the tables shown in FIG. 2 are stored in reference storage 412.

The amplitude metrics (e.g., for gap locations $x_1$, $x_2$, $x_3$, etc.) are passed from amplitude metric generator 410 to reference comparator 414. Reference comparator compares the amplitude metrics against a touch threshold (see, e.g., FIG. 3) and identifies touches when/where the amplitude metric(s) exceed the threshold. The threshold used in the comparison is stored in reference storage 412 and updated as appropriate. The identified touches and corresponding force values are output by reference comparator 414.

The following figure describes an example of a process to update reference data.

Figure 5:
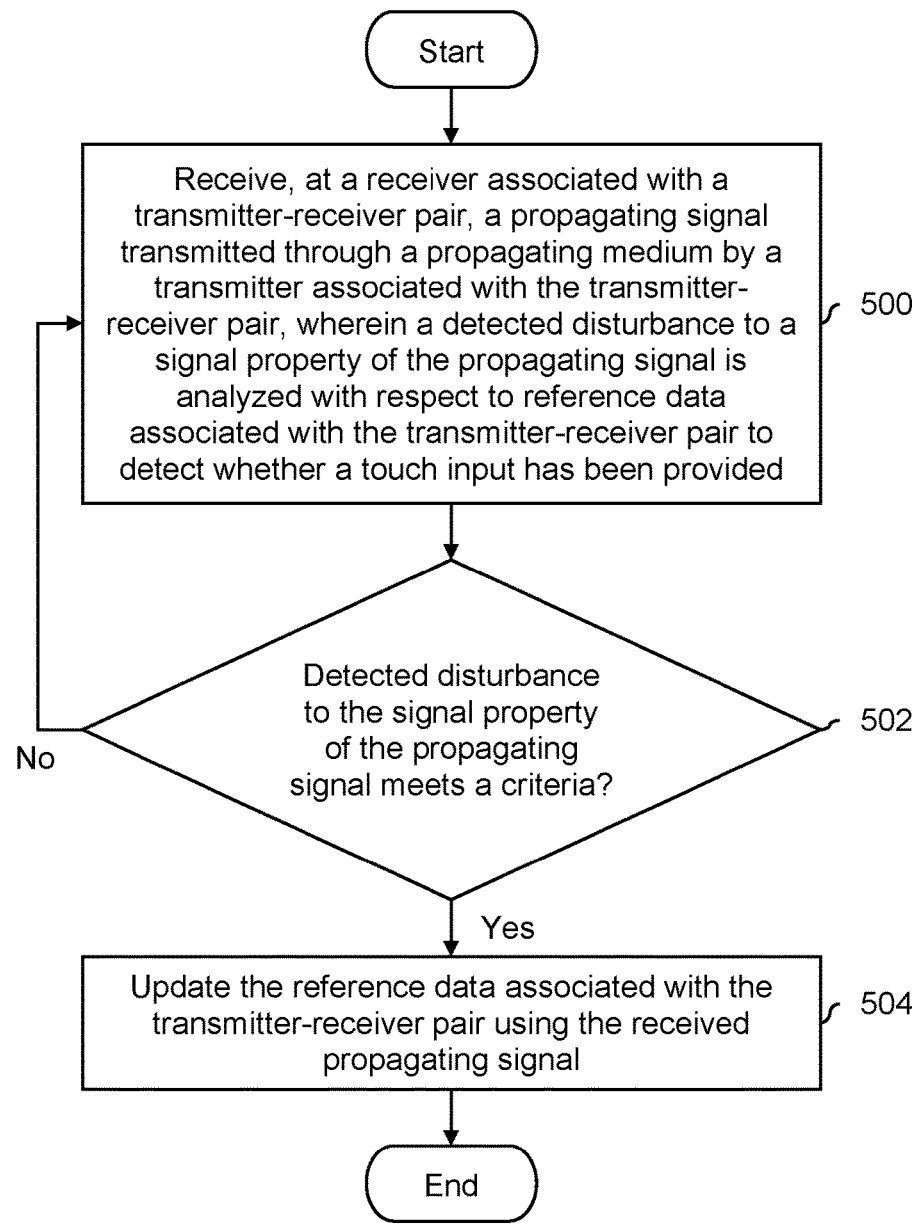
FIG. 5 is a flowchart illustrating an embodiment of a process to update reference data used in a force and/or touch sensing system.

FIG. 5 is a flowchart illustrating an embodiment of a process to update reference data used in a force and/or touch sensing system. In some embodiments, the decision making about whether to update reference data (e.g., step 502) is performed independently on the various transmitter-receiver pairs so that updating reference data for one transmitter-receiver pair (e.g., at step 504) does not necessarily mean that reference data for another transmitter-receiver pair is also updated. In some embodiments, the process of FIG. 5 is performed repeatedly so that reference data is repeatedly updated where and/or when the system determines that it is appropriate to do so.

At 500, a propagating signal transmitted through a propagating medium by a transmitter associated with a transmitter-receiver pair is received at a receiver associated with the transmitter-receiver pair, wherein a detected disturbance to a signal property of the propagating signal is analyzed with respect to reference data associated with the transmitter-receiver pair to detect whether a touch input has been provided.

For example, in FIG. 1F, the transmitter-receiver pair may be transmitter $T_1$ (192) and receiver $R_1$ (182) or transmitter $T_2$ (190) and receiver $R_1$ (182). As for how the propagating signal and reference data are used to detect a touch, amplitude metrics for the gap locations (e.g., $x_1$, $x_2$, etc.) may be calculated per the example equations above. The amplitude metrics may then be compared against a touch threshold where a touch is declared where and/or when the amplitude metric exceeds the touch threshold.

In some embodiments, the propagating signal is also analyzed with respect to reference data in order to determine an amount of force associated with an identified touch. The example of FIG. 3, the largest amplitude metric associated with a touch is output as the force value.

In some embodiments, the phase of the propagating signal is analyzed with respect to a phase reference (e.g., from the reference data) in order to detect when there is a water drop on the touch surface, or when there is a wet touch (e.g., something wet is touching the touch surface).

At 502, it is determined whether a detected disturbance to the signal property of the propagating signal meets a criteria. Some example criteria are described in more detail below.

If the criteria is met at step 502, the reference data associated with the transmitter-receiver pair is updated using the received propagating signal at 504. As will be described in more detail below, in some embodiments, the speed at which reference data is updated may vary. In some cases, the reference data is immediately updated, with old reference data swapped out for new reference data (e.g., in a single cycle or iteration). In some cases, the reference data is gradually updated (e.g., over multiple cycles or iterations).

If the criteria is not met at step 502, another propagating signal is received at step 500. In other words, the reference data is maintained (i.e., not updated) if the criteria is not met at step 502.

The following figure illustrates an example where reference data is updated when there is an amplitude gain.

Figure 6:
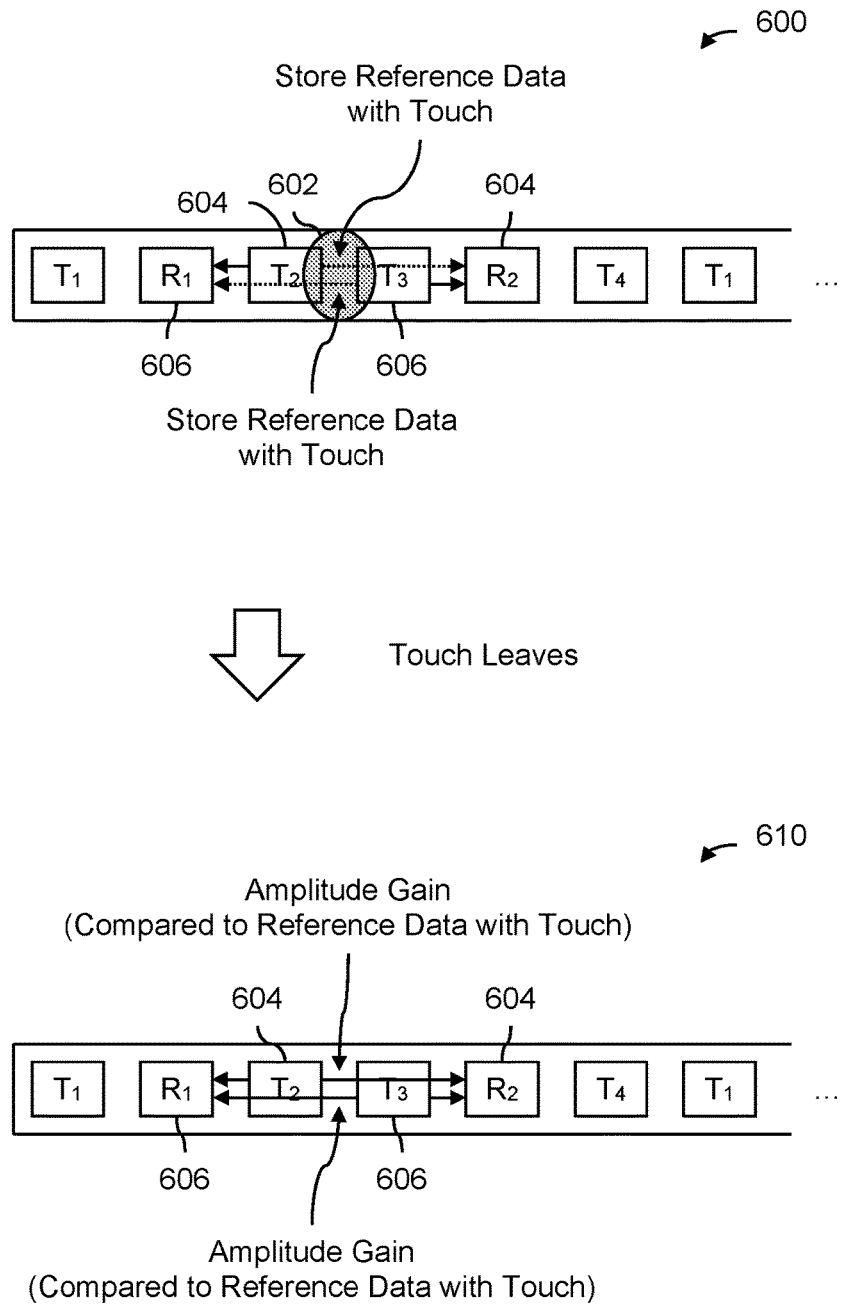
FIG. 6 is a diagram illustrating an embodiment of a touch leaving a touch surface which causes a gain in the amplitude of some of the signals.

FIG. 6 is a diagram illustrating an embodiment of a touch leaving a touch surface which causes a gain in the amplitude of some of the signals. In the example shown, diagram 600 shows a touch surface with transmitters and receivers at a first point in time. In the state shown, there is a touch (602) at the gap between transmitter $T_2$ (associated with transmitter-receiver pair 604) and transmitter $T_3$ (associated with transmitter-receiver pair 606). The $T_2R_2$ signal between transmitter-receiver pair 604 and the $T_3R_1$ signal between transmitter-receiver pair 606 are both partially absorbed by the touch. Since (in this example at least), the update process is running constantly, eventually reference data with the touch (e.g., a signal which is at least partially absorbed by touch 602) is stored for both transmitter-receiver pair 604 and transmitter-receiver pair 606.

The touch then leaves the touch surface and diagram 610 shows the touch surface after the touch is gone. With the touch gone, the $T_2R_2$ signal exchanged between transmitter-receiver pair 604 and the $T_3R_1$ signal exchanged between transmitter-receiver pair 606 are no longer absorbed. This causes the current $T_2R_2$ signal(s) and the current $T_3R_1$ signal(s) to have an amplitude gain when compared against the respective amplitude references. In some embodiments, when an amplitude gain is detected for a given transmitter-receiver pair (as shown here and/or which is indicative of a touch leaving the touch surface), the reference data for that transmitter-receiver pair is updated. The following figure describes this more generally and/or formally in a flowchart.

Figure 7:
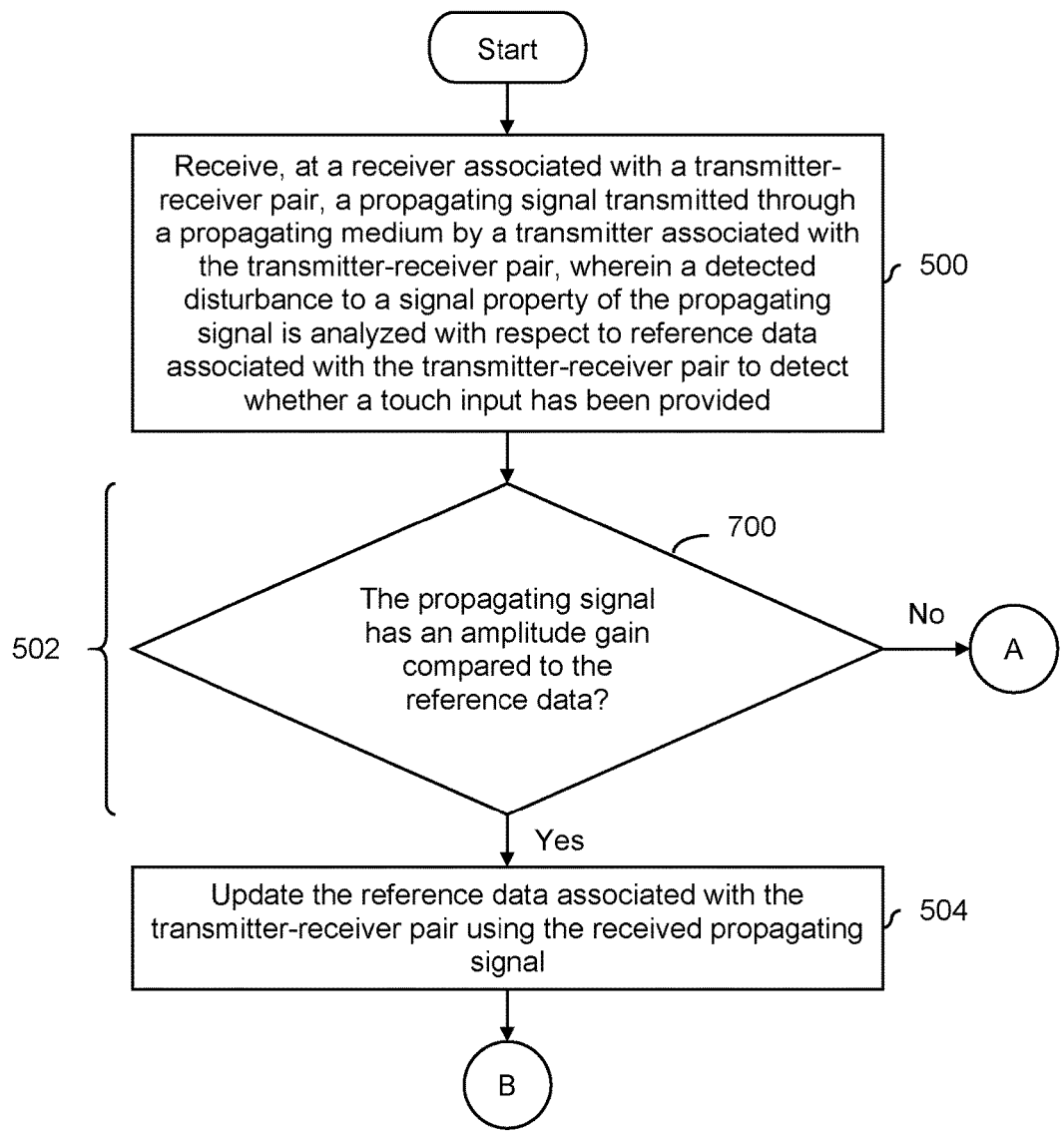
FIG. 7 is a flowchart illustrating an embodiment of an update criteria associated with an amplitude gain.

FIG. 7 is a flowchart illustrating an embodiment of an update criteria associated with an amplitude gain. In some embodiments, the criteria described in step 700 is used at step 502 in FIG. 5 to decide whether a criteria is met. For convenience and to show the same or related steps, reference numbers from FIG. 5 are used here.

At 500, a propagating signal transmitted through a propagating medium by a transmitter associated with a transmitter-receiver pair is received at a receiver associated with the transmitter-receiver pair, wherein a detected disturbance to a signal property of the propagating signal is analyzed with respect to reference data associated with the transmitter-receiver pair to detect whether a touch input has been provided.

At 700, it is determined whether the propagating signal has an amplitude gain compared to the reference data. To put it another way, has the system detected a touch leaving a gap location associated with the given transmitter-receiver pair for which an update is being evaluated (e.g., see FIG. 6)? If so, the reference data associated with the transmitter-receiver pair is updated using the received propagating signal at 504.

The examples of FIG. 6 and FIG. 7 relate to update criteria associated with amplitude gain (e.g., when the (largest) amplitude of the propagating signal is greater than the (largest) amplitude of the reference data). The following figures describe some example update criteria when there is amplitude attenuation.

Figure 8:
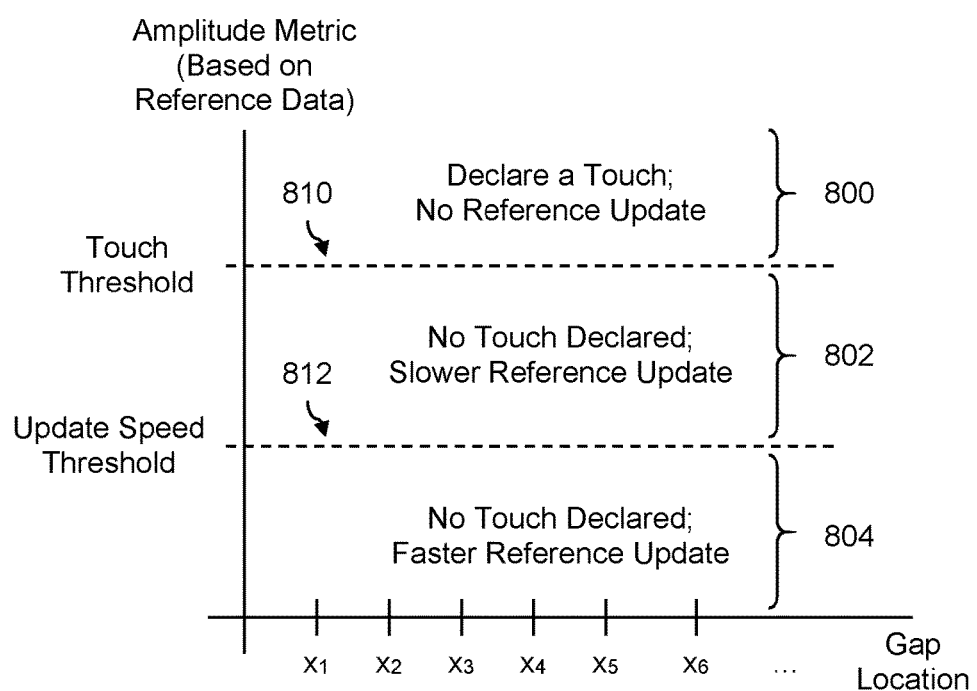
FIG. 8 is a diagram illustrating an embodiment of update criteria associated with an amplitude attenuation.

FIG. 8 is a diagram illustrating an embodiment of update criteria associated with an amplitude attenuation. In the example shown, the graph has gap locations along the x-axis and amplitude metrics along the y-axis. FIG. 8 is similar to FIG. 3, except that no specific amplitude metrics are shown. Rather, the graph is divided up into three regions.

The first region (800) is the region above the touch threshold (810). As described above, the touch threshold is used to identify a touch, where a touch is declared when one or more contiguous gap locations (e.g., $x_1$, $x_2$, etc.) have amplitude metrics that are greater than the touch threshold. See, for example, FIG. 3. In this region, a touch would be declared and any associated reference data would not be updated. For example, consider the amplitude metric for $x_2$ from above:

$$x_2 = \frac{1}{2}(T_2R_1 + T_3R_1 - T_2R_2 + T_3R_2).$$

If the amplitude metric for $x_2$ is greater than the touch threshold, then the reference data associated with transmitter-receiver pairs $(T_2, R_1)$, $(T_3, R_1)$, $(T_2, R_2)$, and $(T_3, R_2)$ are not updated. In one example of why it may be undesirable to update reference data when a touch a declared, this would disallow long-lasting touches. Even slow-ish updates of the reference data during a touch might make the touch slowly fade away and disappear. As a practical matter, very slow updates (e.g., on the order of minutes or more) may be fine. In some embodiments, reference data is updated on what appears to be a touch (e.g., a touch threshold is exceeded), but only for those transmitter-receiver pairs that show a gain, not attenuation.

When the amplitude metric is getting close to the touch threshold but does not exceeded the touch threshold, it could be that a touch is about to happen (e.g., in the near future the amplitude metric for that gap location exceeds the touch threshold). This corresponds to the second region (802) between the touch threshold (810) and the update speed threshold (812). Since the touch threshold is not exceeded in this region, touches are not declared in this region. Similar to above when a touch is declared or detected, it may be undesirable to update the reference data (or at least do it quickly) if a touch is about to occur. As a compromise (e.g., in case the touch threshold is not exceeded in the near future), the reference data is updated at a slower rate compared to region 804. Using a slow update prevents the reference data from being completely contaminated or corrupted with bad reference data since it may be difficult in this region to tell if it is a good time to update the reference data or not. An example of a slower update is described in more detail below.

Region 804 is the region below the update speed threshold (812). In this region, no touch is declared and the reference data for relevant transmitter-receiver pair(s) is updated at a faster rate compared to region 802. Since threshold 812 is the dividing line between whether a faster or slower update is performed, the threshold is referred to here as an update speed threshold.

In some cases, a signal exchanged between a given transmitter-receiver pair may contribute to two or more amplitude metrics and the amplitude metrics may fall into different regions (e.g., regions 800, 802, or 804). For example, in the amplitude metric equations above, the $T_2R_2$ signal contributes to the $x_2$, $x_3$, and $x_4$ amplitude metrics and those amplitude metrics may fall into different regions. In some embodiments, the most restrictive update policy is used. To continue the $T_2R_2$ example from above, suppose the amplitude metric for $x_2$ falls into region 800 (with the most restrictive update policy of not updating the reference data), the amplitude metric for $x_3$ falls into region 802 (which updates the reference data, but does so slower than in region 804, and has the second most restrictive update policy), and the amplitude metric for $x_4$ falls into region 804 (which has the least restrictive update policy). In that case, reference data associated with the $T_2R_2$ transmitter-receiver pair (where $T_2R_2$ contributes to the amplitude metrics for $x_2$, $x_3$, and $x_4$) would not be updated per the update policy associated with region 800 since that is the most restrictive update policy.

The following figure shows an example of reference data being updated at a faster rate and a slower rate.

Figure 9:
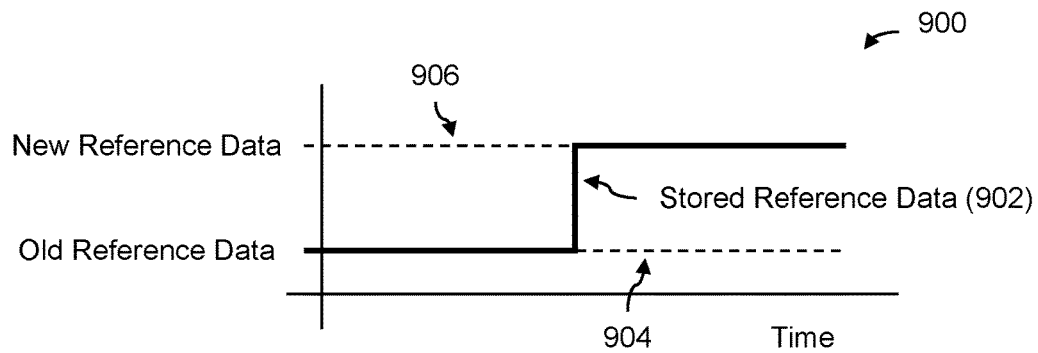
FIG. 9 is a diagram illustrating an embodiment of a faster update and a slower update of reference data.
Figure 9:
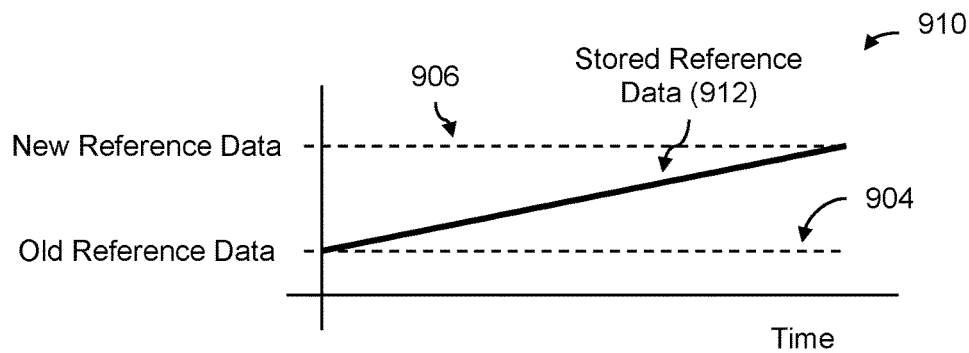

FIG. 9 is a diagram illustrating an embodiment of a faster update and a slower update of reference data. Diagram 900 shows a faster update of reference data, which in this case is an immediate update. Function 902 represents the stored reference data (e.g., for a given transmitter-receiver pair). Initially, the stored reference data is at the same level as old reference data (904) but then switches over (e.g., in a step function-like manner) immediately to the level of the new reference data (906).

Diagram 910 shows an example of a slower and gradual update. In this example, the stored reference data (910) begins at the level of the old reference data (904) and then gradually increases until it reaches the level of the new reference data (906).

For clarity and ease of explanation, the new reference data in diagram 910 is shown as a constant or steady value while the stored reference data (912) gradually transitions from the old reference data to the new reference data. In real life, the new reference data itself may be changing as the stored reference data gradually approaches the level or value of the new reference data. In some embodiments, this is managed by applying some fraction of the difference between the old reference data and new reference data to the old reference data (e.g., $$RD_{stored} = RD_{old} + \frac{1}{n}(RD_{new} - RD_{old})$$

Other forms of low pass filtering may be used (e.g., with the new reference data at in the input of the low pass filter and the stored reference data at the output of the filter) so that the stored reference data gradually approaches the new reference data.

It is noted that a faster update (e.g., corresponding to region 802 in FIG. 8) is not required to be an immediate update and may be a gradual update. For example, region 802 and region 804 in FIG. 8 may both update stored reference data in a gradual manner, but the rate at which the update is performed for region 802 may be slower than the rate for region 804.

The following figure more formally and/or generally describes this in a flowchart.

Figure 10:
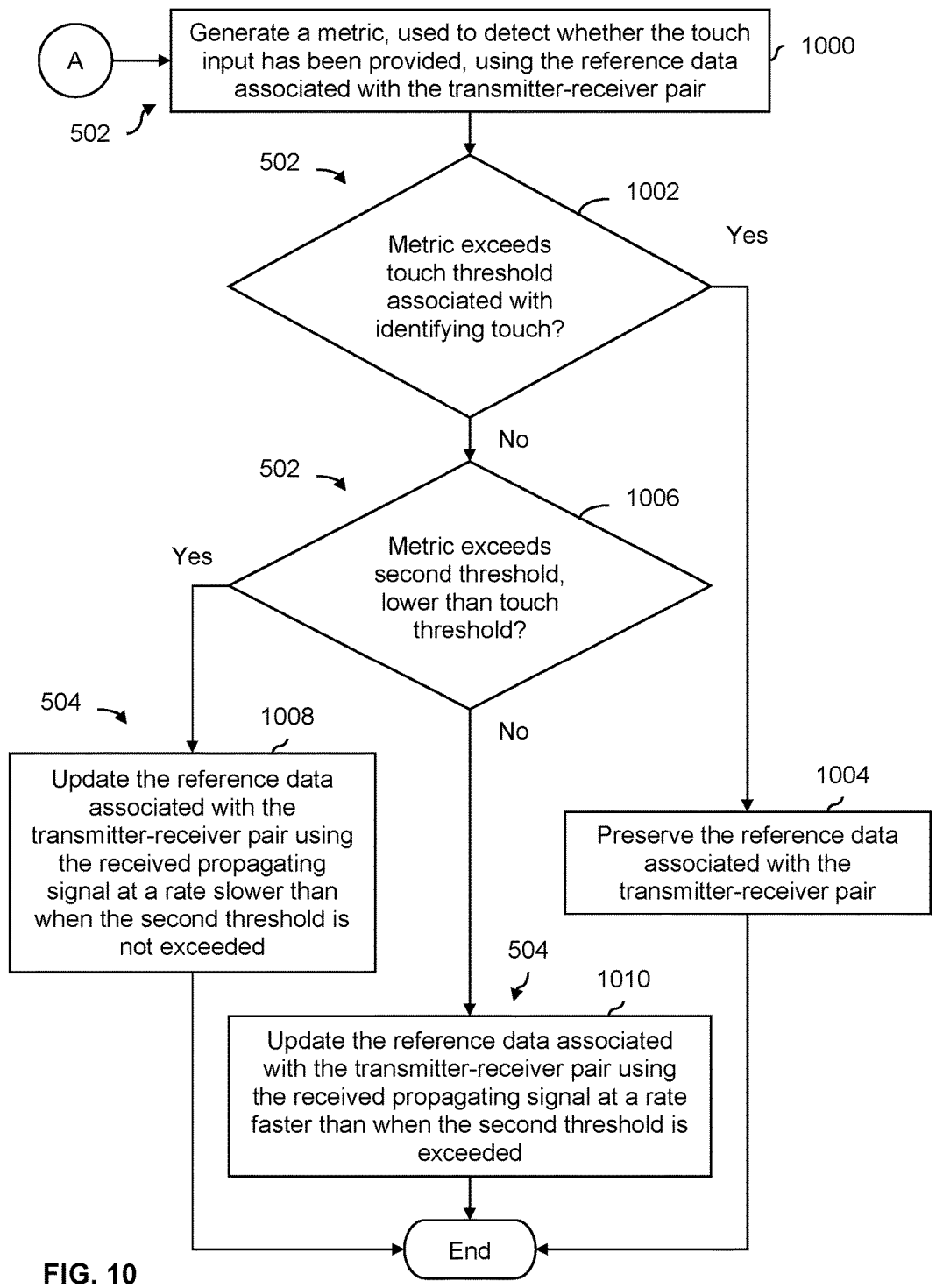
FIG. 10 is a flowchart illustrating an embodiment of a process to decide whether criteria associated with a touch threshold and/or a second, lower threshold is/are met.

FIG. 10 is a flowchart illustrating an embodiment of a process to decide whether criteria associated with a touch threshold and/or a second, lower threshold is/are met. In some embodiments, the process shown is part of the process of FIG. 5. For example, step 1000, step 1002, and/or step 1006 may be part of step 502 in FIG. 5; step 1008 and/or step 1010 may be part of step 504 in FIG. 5. In some embodiments, the process shown is performed in combination with the process of FIG. 7. For example, the process shown may be performed if the decision at step 700 in FIG. 7 is No.

At 1000, a metric, used to detect whether the touch input has been provided, is generated using the reference data associated with the transmitter-receiver pair. See, for example, the amplitude metric equations above which depend upon one or more TA values. In turn, $$T_iR_j = 10\log_{10}\left|\frac{\text{Amplitude}_{new}}{\text{Amplitude}_{reference}}\right|$$

where the amplitude reference value (in the denominator of the log function) comes from the stored reference data for that transmitter-receiver pair.

At 1002, it is decided whether the metric exceeds a touch threshold associated with identifying touch. See, for example, touch threshold 810 shown in FIG. 8. If it is determined at step 1002 that the touch threshold is exceeded, then at step 1004 the reference data associated with the transmitter-receiver pair is preserved. To put it another way, the reference data is not updated. In the example of FIG. 8, this corresponds to region 800 above touch threshold 810.

If it is determined at step 1002 that the touch threshold is not exceeded, then at step 1006 it is determined if a second threshold, lower than the touch threshold, is exceeded. Update speed threshold 812 in FIG. 8 shows one example of such a second threshold. If the second threshold is exceeded at step 1006, then at step 1008 the reference data associated with the transmitter-receiver pair is updated using the received propagating signal at a rate slower than when the second threshold is not exceeded. In the example of FIG. 8, this corresponds to region 802 between update speed threshold 812 and touch threshold 810. FIG. 9 shows an example of faster versus slower updating.

If the second threshold is not exceeded at step 1006, then at step 1010 the reference data associated with the transmitter-receiver pair is updated using the received propagating signal at a rate faster than when the second threshold is exceeded. In the example of FIG. 8, this corresponds to region 804 below update speed threshold 812.

As described above, in some embodiments, if some reference data contributes to two or more (amplitude) metrics and one (amplitude) metric falls into one region or category and another (amplitude) metric falls into another region or category, the more restrictive update policy applies or wins out.

This concept of a faster versus slower update may be applied to the example of FIG. 6 and FIG. 7 where reference data is updated if there is an amplitude gain. The following figures show an example of this.

Figure 11:
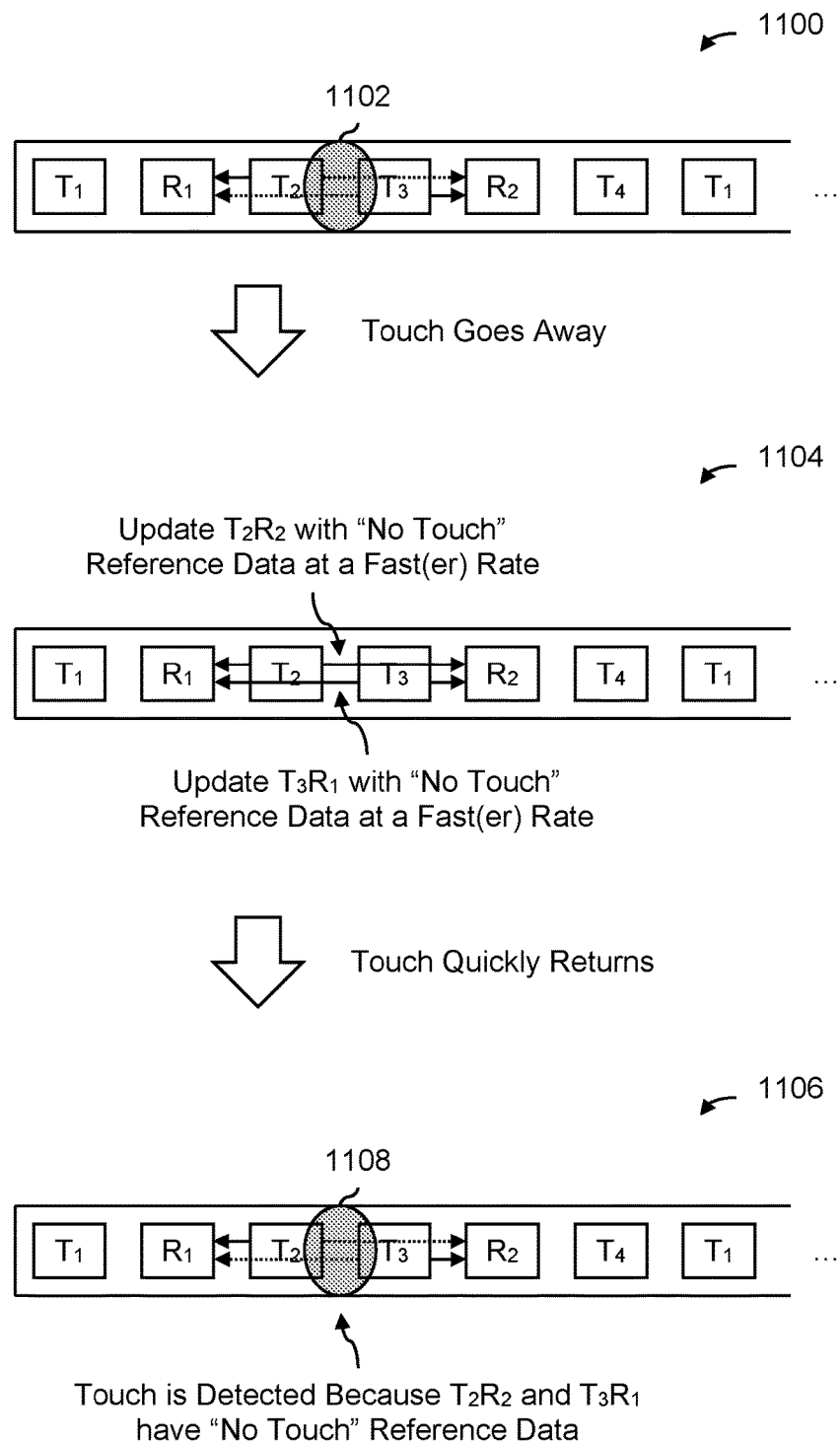
FIG. 11 is a diagram illustrating an embodiment of a touch leaving and quickly returning to a touch surface.

FIG. 11 is a diagram illustrating an embodiment of a touch leaving and quickly returning to a touch surface. In the example shown, diagram 1100 shows the touch surface at a first point in time. In the state shown, there is a touch (1102) on the touch surface.

The touch goes away and diagram 1104 shows the touch surface after the touch is gone. The reference data for transmitter-receiver pair ($T_2$, $R_2$) (which in diagram 1100 exchanged a signal which was at least partially absorbed by touch 1102) and the reference data for transmitter-receiver pair ($T_3$, $R_1$) (which also had its signal absorbed to some degree) is updated with "no touch" reference data. That is, a signal which is not absorbed by a touch is used to update the reference data. Since a touch leaving (i.e., an amplitude gain) is distinctive and/or difficult to mistake for other events, it is safe to update the relevant reference data at a faster rate.

The touch returns soon after leaving, and diagram 1106 shows the touch surface after the touch (1108) returns to the same location. Since the reference data for transmitter-receiver pair ($T_2$, $R_2$) and transmitter-receiver pair ($T_3$, $R_1$) has been updated with "no touch" data (i.e., with little absorption), the system is able to quickly detect the touch. If the reference data for transmitter-receiver pair ($T_2$, $R_2$) and/or transmitter-receiver pair ($T_3$, $R_1$) still had "touched" signals or data stored, the touch threshold might not be triggered and the touch sensor system might not identify the touch as quickly. As shown here, it may be desirable for performance reasons to update reference data at a faster rate (rather than some slower rate) when there is an amplitude gain (e.g., which is indicative of a touch leaving).

The following figure describes this more formally and/or generally in a flowchart.

Figure 12:
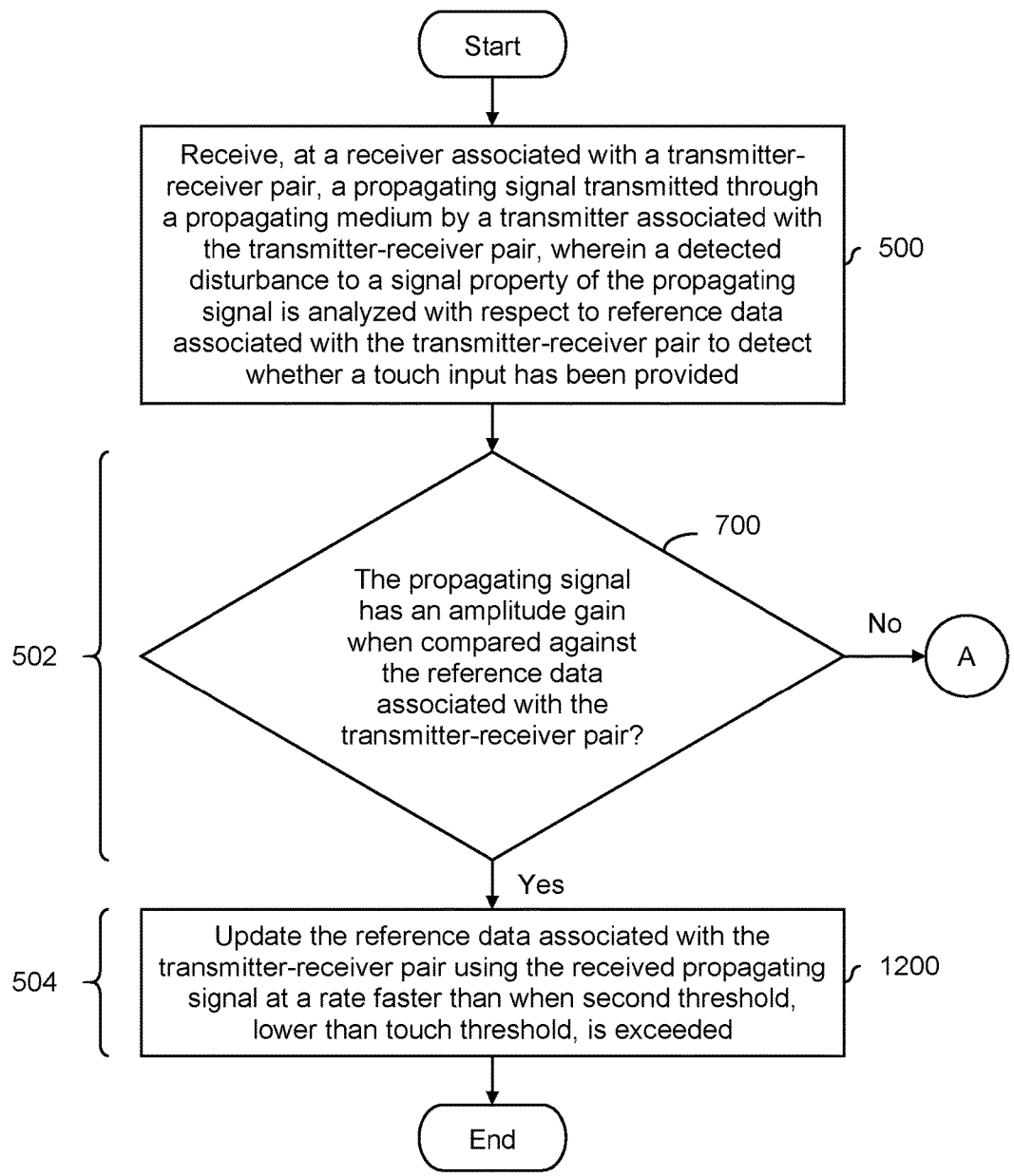
FIG. 12 is a flowchart illustrating an embodiment of a process to update reference data at a faster rate when there is an amplitude gain.

FIG. 12 is a flowchart illustrating an embodiment of a process to update reference data at a faster rate when there is an amplitude gain. In some embodiments, the process shown is used during the process of FIG. 5 (e.g., step 700 is included in step 502 in FIG. 5 and step 1200 is included in step 504 in FIG. 5).

At 500, a propagating signal transmitted through a propagating medium by a transmitter associated with a transmitter-receiver pair is received at a receiver associated with the transmitter-receiver pair, wherein a detected disturbance to a signal property of the propagating signal is analyzed with respect to reference data associated with the transmitter-receiver pair to detect whether a touch input has been provided. This is the same step 500 as in FIG. 5.

At 700, it is determined whether the propagating signal has an amplitude gain when compared against the reference data associated with the transmitter-receiver pair. This is the same step 700 as in FIG. 7.

If there is an amplitude gain at step 700, then at 1200 the reference data associated with the transmitter-receiver pair is updated using the received propagating signal at a rate faster than when a second threshold, lower than a touch threshold, is exceeded. For example, the update may occur at the faster rate associated with region 804 in FIG. 8 as opposed the slower rate associated with region 802.

In some cases, a touch surface has a water on it (e.g., from rain, from the user's wet hands, etc.) If not properly managed and/or accounted for (e.g., in the reference data), the presence of water on the touch surface can cause the touch logic to detect a touch where there is none. The following figures describes two approaches for dealing with this. In the first approach, the reference data is (e.g., improperly) updated when it should not have been updated (e.g., when there is water on the touch surface) and the updated reference data is subsequently corrected (e.g., so that the improper reference data does not cause the touch logic to incorrectly flag or identify a touch). In the second approach, the update logic tries to better differentiate or identify when it should and should not update the reference data (e.g., ahead of time) and so subsequently does not need to make any correction of the reference data because an improper update of the reference data did not occur. The processes of FIG. 13A and FIG. 13B may be used in combination with any of the above examples.

Figure 13A:
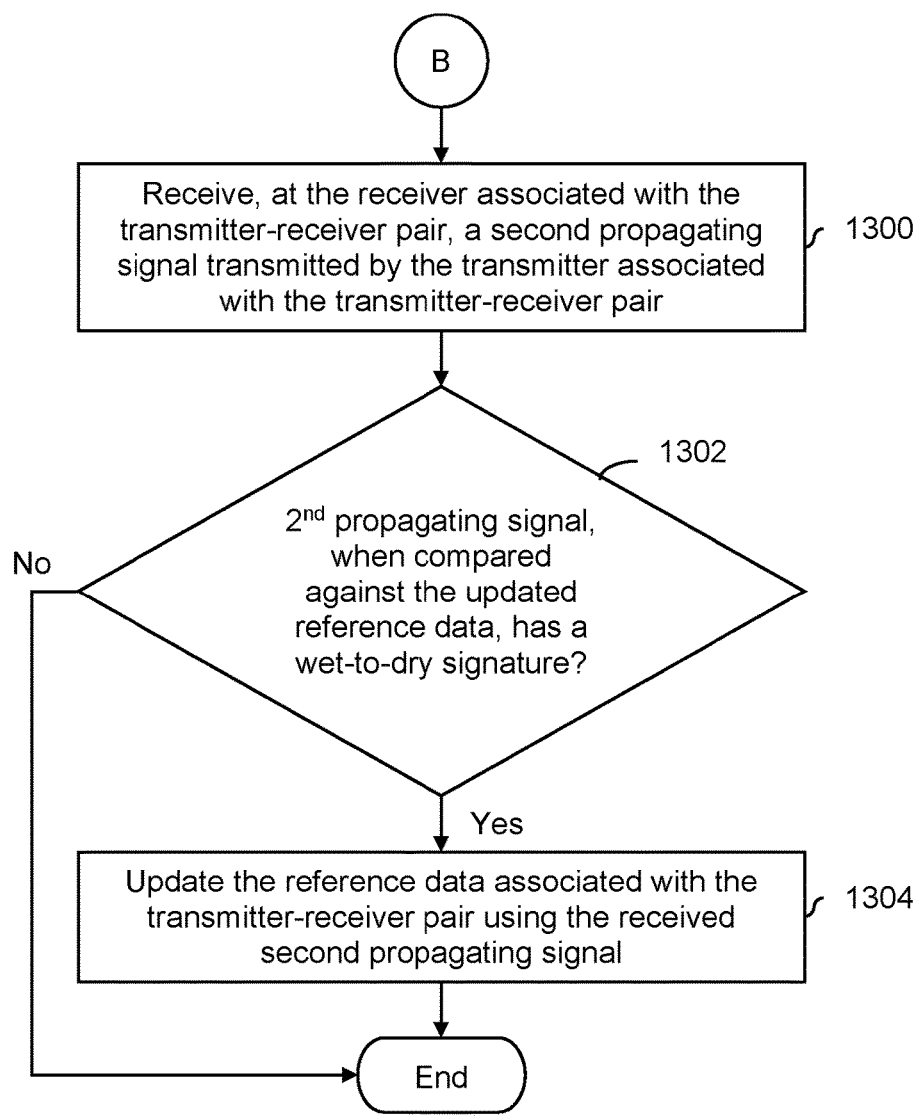
FIG. 13A is a flowchart illustrating an embodiment of a process to update reference data if the reference data was incorrectly updated when a touch surface was wet.

FIG. 13A is a flowchart illustrating an embodiment of a process to update reference data if the reference data was incorrectly updated when a touch surface was wet. In some embodiments, the process of FIG. 13A is performed in combination with the process of FIG. 7. For example, a water drop, located on a propagating medium and/or touch surface between a transmitter and a receiver (e.g., in a same pair) may cause the propagating signal to have an amplitude gain when compared against the (e.g., "dry") reference data. This would cause the reference data to be updated at step 504 in FIG. 7.

At 1300, a second propagating signal transmitted by the transmitter associated with the transmitter-receiver pair is received at the receiver associated with the transmitter-receiver pair. For example, this propagating signal is exchanged at a second point in time after step 500 in FIG. 7.

At 1302, it is determined if the second propagating signal, when compared against the updated reference data (e.g., updated at step 504 in FIG. 7), has a wet-to-dry signature. That is, it is believed that the propagating medium and/or touch surface was wet and was then dried off? In one example, if (e.g., when comparing the second propagating signal and the updated reference data) there is an amplitude attenuation which exceeds a first (e.g., correction) threshold and a phase change which exceeds a second (e.g., correction) threshold, then that is indicative of the propagating medium and/or touch surface going from wet to dry.

If so, the reference data associated with the transmitter-receiver pair is updated using the received second propagating signal at 1304. For example, if a propagating medium and/or touch surface is wet (and the reference data is updated with "wet" reference data), if the reference data is not corrected (e.g., with "dry" reference data) when the water is removed from the propagating medium and/or touch surface, the touch detection logic will incorrectly identify a touch because of the "wet" reference data. For example, the "wet" reference data when compared against a propagating signal (which goes through a "now-dry" propagating medium) will make it seem like there is an amplitude attention, which will be flagged as a touch when in fact there is no touch.

In some embodiments, this approach of letting some improper updates occur and then fixing or correcting the reference data after the fact is used in systems where the touch logic does not differentiate between a touch and a water drop. In some embodiments, this approach of fixing the reference data after the fact is desirable in systems where processing and/or power is more limited (e.g., because doing a better job ahead of time of identifying whether or not to update the reference data requires more processing resources, which in turn requires more power consumption).

Figure 13B:
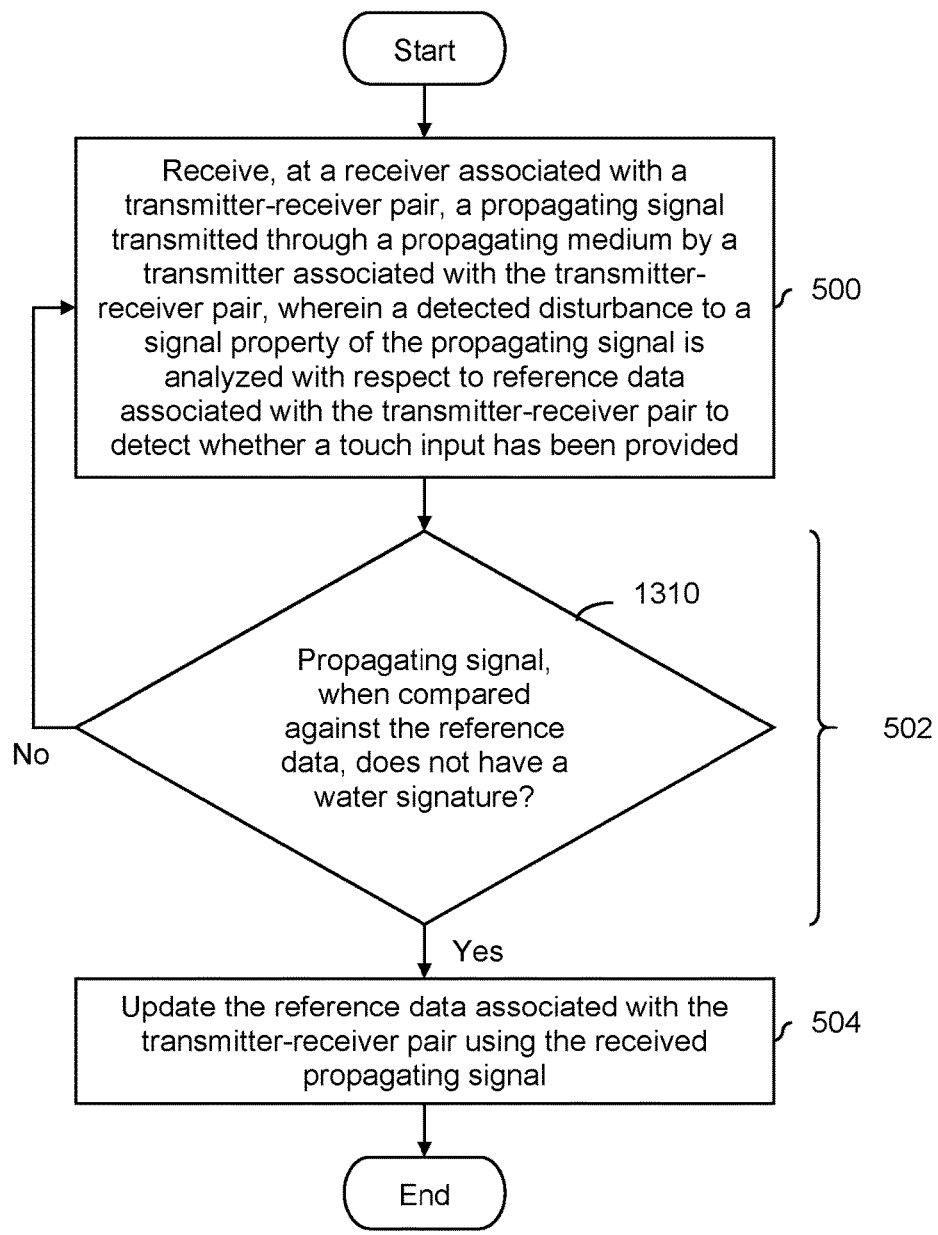
FIG. 13B is a flowchart illustrating an embodiment of a process to update reference data which differentiates between a touch and water and does not update the reference data in the case of the latter.

FIG. 13B is a flowchart illustrating an embodiment of a process to update reference data which differentiates between a touch and water and does not update the reference data in the case of the latter.

At 500, a propagating signal transmitted through a propagating medium by a transmitter associated with the transmitter-receiver pair is received at a receiver associated with a transmitter-receiver pair, wherein a detected disturbance to a signal property of the propagating signal is analyzed with respect to reference data associated with the transmitter-receiver pair to detect whether a touch input has been provided. Various examples have been described above.

At 1310, it is determined whether the propagating signal, when compared against the reference data, does not have a water signature. This is one example of a criteria at step 502 in FIG. 5. In one example, the phase change (e.g., between the propagating signal and the reference data) is compared against a water threshold. If the phase change is greater than the water threshold, then that is indicative of water.

If there is no water signature at step 1310, then the reference data associated with the transmitter-receiver pair is updated using the received propagating signal at 504. In other words, on this path, the touch logic thinks there is an actual touch (e.g., as opposed to a water drop) and it is safe to update the reference data.

If there is a water signature at step 1310, then the reference data is not updated (e.g., and system continues to receive and analyze propagating signals. In other words, if the touch logic believes there is a water drop, the reference data is not update.

In some embodiments, the process of FIG. 13B has better performance compared to FIG. 13A but consumes more power and/or more processing resources. For example, this process may produce slightly better results than the process of FIG. 13A (e.g., no false touch detections which only briefly last when there is water and/or water is wiped away), but that difference may be indistinguishable to a user.

Figure 14:
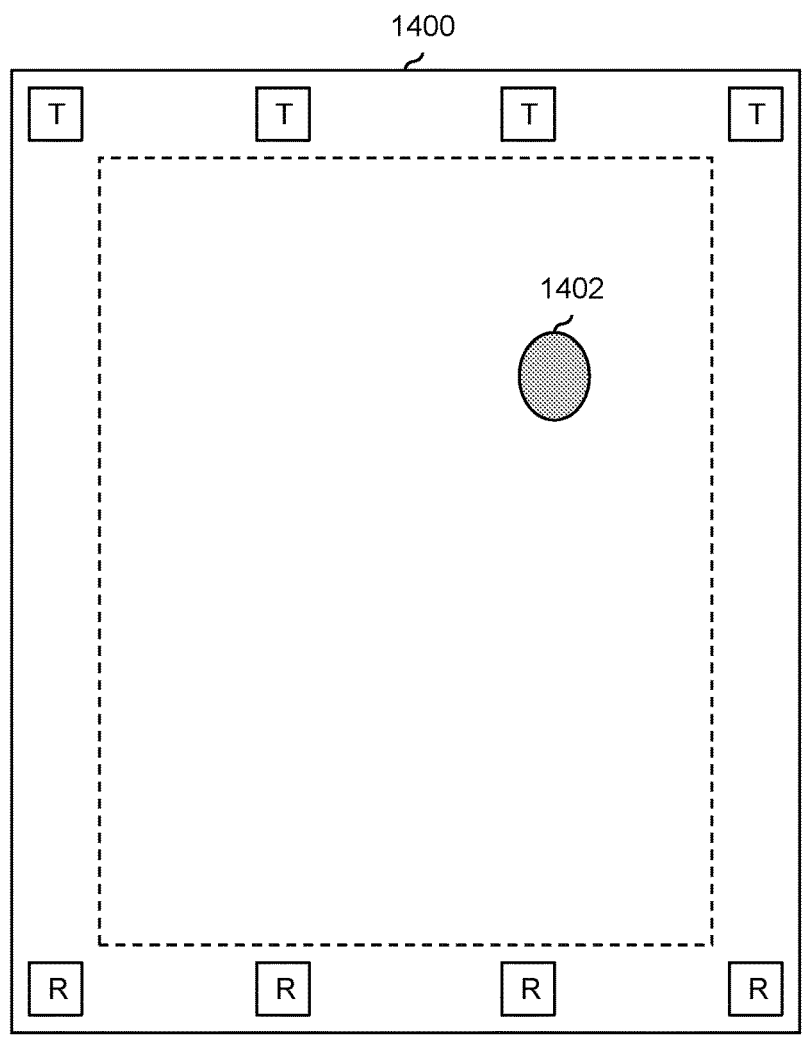
FIG. 14 is a diagram illustrating an embodiment of a two-dimensional touch surface.

FIG. 14 is a diagram illustrating an embodiment of a two-dimensional touch surface. In the example shown, surface 1400 is a two-dimensional touch surface where transmitters are arranged along the top of the touch surface and receivers are arranged along the bottom of the touch surface. Transmitter-receiver pairs are used to detect exemplary touch 1402 and/or a force value for touch 1402 and reference data associated with the transmitter-receiver pairs are updated using one or more of the techniques described above. To put it another way, the techniques described above for updating reference data are not limited to one-dimensional surfaces.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a transmitter-receiver pair which includes a transmitter and a receiver, wherein the transmitter-receiver pair is configured to receive, at the receiver associated with the transmitter-receiver pair, a propagating signal transmitted through a propagating medium by the transmitter associated with the transmitter-receiver pair, wherein a detected disturbance to a signal property of the propagating signal is analyzed with respect to reference data associated with the transmitter-receiver pair to detect whether a touch input has been provided;
a processor which is configured to:
determine whether a detected disturbance to the signal property of the propagating signal meets a criteria, including by:
generating a metric, used to detect whether the touch input has been provided, using the reference data associated with the transmitter-receiver pair;
determining whether the metric exceeds a touch threshold associated with identifying touch; and
determining whether the metric exceeds a second threshold, lower than the touch threshold; and
in the event it is determined that the criteria is met, update the reference data associated with the transmitter-receiver pair using the received propagating signal, including by:
in the event it is determined that (1) the metric does not exceed the touch threshold and (2) the metric exceeds the second threshold: updating the reference data associated with the transmitter-receiver pair using the received propagating signal at a rate slower than when the second threshold is not exceeded; and
in the event it is determined that (1) the metric does not exceed the touch threshold and (2) the metric does not exceed the second threshold: updating the reference data associated with the transmitter-receiver pair using the received propagating signal at a rate faster than when the second threshold is exceeded; and
a storage which is configured to store the reference data associated with the transmitter-receiver pair.

2. The system recited in claim 1, wherein the reference data includes an amplitude reference and a phase reference.

3. The system recited in claim 1, wherein determining whether the criteria is met includes determining whether the propagating signal has an amplitude gain compared to the reference data, wherein the reference data is updated in the event the propagating signal has an amplitude gain compared to the reference data.

4. The system recited in claim 1, wherein:
  determining whether the criteria is met further includes:
    determining whether the propagating signal has an amplitude gain when compared against the reference data associated with the transmitter-receiver pair; and
  updating the reference data further includes:
    in the event it is determined that the propagating signal has an amplitude gain when compared against the reference data, updating the reference data associated with the transmitter-receiver pair using the received propagating signal at a rate faster than when the second threshold is exceeded.

5. A system, comprising:
  a transmitter-receiver pair which includes a transmitter and a receiver, wherein:
    the transmitter-receiver pair is configured to receive, at the receiver associated with the transmitter-receiver pair, a propagating signal transmitted through a propagating medium by the transmitter associated with the transmitter-receiver pair, wherein a detected disturbance to a signal property of the propagating signal is analyzed with respect to reference data associated with the transmitter-receiver pair to detect whether a touch input has been provided; and
    the transmitter-receiver pair is further configured to receive, at the receiver associated with the transmitter-receiver pair, a second propagating signal transmitted by the transmitter associated with the transmitter-receiver pair;
  a processor which is configured to:
    determine whether a detected disturbance to the signal property of the propagating signal meets a criteria;
    in the event it is determined that the criteria is met, update the reference data associated with the transmitter-receiver pair using the received propagating signal;
    determine whether the second propagating signal, when compared against the updated reference data, has a wet-to-dry signature; and
    in the event it is determined that there is a wet-to-dry signature, update the reference data associated with the transmitter-receiver pair using the received second propagating signal; and
  a storage which is configured to store the reference data associated with the transmitter-receiver pair.

6. The system recited in claim 5, wherein:
  the wet-to-dry signature includes if, when comparing the second propagating signal and the updated reference data, there is an amplitude attenuation which exceeds a first correction threshold and a phase change which exceeds a second correction threshold.

7. The system recited in claim 1, wherein determining whether the criteria is met includes determining whether the propagating signal, when compared against the reference data, does not have a water signature.

8. The system recited in claim 1, wherein:
  determining whether the criteria is met includes determining whether the propagating signal, when compared against the reference data, does not have a water signature; and
  the water signature includes if, when comparing the propagating signal and the reference data, there is a phase change which exceeds a water threshold.

9. A method, comprising:
  receiving, at a receiver associated with a transmitter-receiver pair, a propagating signal transmitted through a propagating medium by a transmitter associated with the transmitter-receiver pair, wherein a detected disturbance to a signal property of the propagating signal is analyzed with respect to reference data associated with the transmitter-receiver pair to detect whether a touch input has been provided;
  determining whether a detected disturbance to the signal property of the propagating signal meets a criteria, including by:
    generating a metric, used to detect whether the touch input has been provided, using the reference data associated with the transmitter-receiver pair;
    determining whether the metric exceeds a touch threshold associated with identifying touch; and
    determining whether the metric exceeds a second threshold, lower than the touch threshold; and
  in the event it is determined that the criteria is met, updating the reference data associated with the transmitter-receiver pair using the received propagating signal, including by:
    in the event it is determined that (1) the metric does not exceed the touch threshold and (2) the metric exceeds the second threshold: updating the reference data associated with the transmitter-receiver pair using the received propagating signal at a rate slower than when the second threshold is not exceeded; and
    in the event it is determined that (1) the metric does not exceed the touch threshold and (2) the metric does not exceed the second threshold: updating the reference data associated with the transmitter-receiver pair using the received propagating signal at a rate faster than when the second threshold is exceeded.

10. The method recited in claim 9, wherein determining whether the criteria is met includes determining whether the propagating signal has an amplitude gain compared to the reference data, wherein the reference data is updated in the event the propagating signal has an amplitude gain compared to the reference data.

11. The method recited in claim 9, wherein:
  determining whether the criteria is met further includes:
    determining whether the propagating signal has an amplitude gain when compared against the reference data associated with the transmitter-receiver pair; and
  updating the reference data further includes:
    in the event it is determined that the propagating signal has an amplitude gain when compared against the reference data, updating the reference data associated with the transmitter-receiver pair using the received propagating signal at a rate faster than when the second threshold is exceeded.

12. A method, comprising:
  receiving, at a receiver associated with a transmitter-receiver pair, a propagating signal transmitted through a propagating medium by a transmitter associated with the transmitter-receiver pair, wherein a detected disturbance to a signal property of the propagating signal is analyzed with respect to reference data associated with the transmitter-receiver pair to detect whether a touch input has been provided;

receiving, at the receiver associated with the transmitter-receiver pair, a second propagating signal transmitted by the transmitter associated with the transmitter-receiver pair;

determining whether a detected disturbance to the signal property of the propagating signal meets a criteria;

in the event it is determined that the criteria is met, updating the reference data associated with the transmitter-receiver pair using the received propagating signal;

determining whether the second propagating signal, when compared against the updated reference data, has a wet-to-dry signature; and in the event it is determined that there is a wet-to-dry signature, updating the reference data associated with the transmitter-receiver pair using the received second propagating signal.

13. The method recited in claim 12 wherein: the wet-to-dry signature includes if, when comparing the second propagating signal and the updated reference data, there is an amplitude attenuation which exceeds a first correction threshold and a phase change which exceeds a second correction threshold.

14. The method recited in claim 9, wherein determining whether the criteria is met includes determining whether the propagating signal, when compared against the reference data, does not have a water signature.

15. The method recited in claim 9, wherein:
determining whether the criteria is met includes determining whether the propagating signal, when compared against the reference data, does not have a water signature; and
the water signature includes if, when comparing the propagating signal and the reference data, there is a phase change which exceeds a water threshold.

16. A computer program product, the computer program product being embodied in a tangible, non-transitory computer readable storage medium and comprising computer instructions for:
receiving, at a receiver associated with a transmitter-receiver pair, a propagating signal transmitted through a propagating medium by a transmitter associated with the transmitter-receiver pair, wherein a detected disturbance to a signal property of the propagating signal is analyzed with respect to reference data associated with the transmitter-receiver pair to detect whether a touch input has been provided;
determining whether a detected disturbance to the signal property of the propagating signal meets a criteria, including by:
generating a metric, used to detect whether the touch input has been provided, using the reference data associated with the transmitter-receiver pair;
determining whether the metric exceeds a touch threshold associated with identifying touch; and
determining whether the metric exceeds a second threshold, lower than the touch threshold; and
in the event it is determined that the criteria is met, updating the reference data associated with the transmitter-receiver pair using the received propagating signal, including by:

in the event it is determined that (1) the metric does not exceed the touch threshold and (2) the metric exceeds the second threshold: updating the reference data associated with the transmitter-receiver pair using the received propagating signal at a rate slower than when the second threshold is not exceeded; and
in the event it is determined that (1) the metric does not exceed the touch threshold and (2) the metric does not exceed the second threshold: updating the reference data associated with the transmitter-receiver pair using the received propagating signal at a rate faster than when the second threshold is exceeded.

17. The computer program product recited in claim 16, wherein:
determining whether the criteria is met further includes:
determining whether the propagating signal has an amplitude gain when compared against the reference data associated with the transmitter-receiver pair; and
updating the reference data further includes:
in the event it is determined that the propagating signal has an amplitude gain when compared against the reference data, updating the reference data associated with the transmitter-receiver pair using the received propagating signal at a rate faster than when the second threshold is exceeded.

18. A computer program product, the computer program product being embodied in a tangible, non-transitory computer readable storage medium and comprising computer instructions for:
receiving, at a receiver associated with a transmitter-receiver pair, a propagating signal transmitted through a propagating medium by a transmitter associated with the transmitter-receiver pair, wherein a detected disturbance to a signal property of the propagating signal is analyzed with respect to reference data associated with the transmitter-receiver pair to detect whether a touch input has been provided;
receiving, at the receiver associated with the transmitter-receiver pair, a second propagating signal transmitted by the transmitter associated with the transmitter-receiver pair;
determining whether a detected disturbance to the signal property of the propagating signal meets a criteria;
in the event it is determined that the criteria is met, updating the reference data associated with the transmitter-receiver pair using the received propagating signal;
determining whether the second propagating signal, when compared against the updated reference data, has a wet-to-dry signature; and
in the event it is determined that there is a wet-to-dry signature, updating the reference data associated with the transmitter-receiver pair using the received second propagating signal.

19. The computer program product recited in claim 18 wherein: the wet-to-dry signature includes if, when comparing the second propagating signal and the updated reference data, there is an amplitude attenuation which exceeds a first correction threshold and a phase change which exceeds a second correction threshold.

* * * * *